US012567514B2

(12) United States Patent
Holcombe et al.

(10) Patent No.: US 12,567,514 B2
(45) Date of Patent: Mar. 3, 2026

(54) LOW SAG TREE WIRE

(71) Applicant: Southwire Company, LLC, Carrollton, GA (US)

(72) Inventors: Charles L. Holcombe, Newnan, GA (US); Drew Wallace Pearson, Villa Rica, GA (US); Joachim Axel Schlumberger, Atlanta, GA (US); Barrett M. Kimball, Bremen, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 17/085,383

(22) Filed: Oct. 30, 2020

(65) Prior Publication Data

US 2021/0134474 A1 May 6, 2021

Related U.S. Application Data

(60) Provisional application No. 62/929,516, filed on Nov. 1, 2019.

(51) Int. Cl.

| | |
|---|---|
| ***H01B 5/08*** | (2006.01) |
| ***H01B 1/02*** | (2006.01) |
| ***H01B 3/42*** | (2006.01) |
| ***H01B 5/10*** | (2006.01) |
| ***H01B 7/29*** | (2006.01) |
| ***H01B 17/14*** | (2006.01) |

(52) U.S. Cl.

CPC ............... *H01B 1/023* (2013.01); *H01B 3/42* (2013.01); *H01B 5/104* (2013.01); *H01B 7/292* (2013.01); *H01B 17/145* (2013.01)

(58) Field of Classification Search

CPC .................................. H01B 5/08; H01B 9/027

See application file for complete search history.

(56) References Cited

U.S. PATENT DOCUMENTS

| | | | | |
|---|---|---|---|---|
| 4,677,818 | A | 7/1987 | Honda | |
| 7,093,416 | B2 * | 8/2006 | Johnson | H01B 13/0235 57/212 |
| 7,629,535 | B2 * | 12/2009 | Espen | H01B 7/14 174/102 R |
| 7,650,742 | B2 | 1/2010 | Ushijima | |
| 7,683,262 | B2 | 3/2010 | Guery et al. | |
| 8,250,845 | B2 | 8/2012 | Kimura | |
| 9,012,781 | B2 | 4/2015 | Daniel | |
| 9,812,232 | B2 * | 11/2017 | Kibe | H01B 3/446 |
| 9,847,152 | B2 | 12/2017 | Powers | |
| 9,997,279 | B2 * | 6/2018 | Mayama | H01B 7/295 |

(Continued)

OTHER PUBLICATIONS

Mehdi et al., "X-Functional Phthalonitrile Monomers and Polymers," Chapter 3, In Plastics Design Library, Phthalonitrile Resins and Composites, Eds. Mehdi et al., William Andrew Publishing, 2018, pp. 107-174 ("Mehdi").

(Continued)

*Primary Examiner* — Chau N Nguyen

(74) *Attorney, Agent, or Firm* — Merchant & Gould P.C.; Daniel R. Evans

(57) ABSTRACT

Disclosed herein is a tree wire and a method of preparing the same. The tree wire disclosed herein has an improved ampacity compared to a conventional ACSR tree wire, as well as reduced sag compared to a conventional ACSR bare conductor and/or ACSR tree wire.

20 Claims, 16 Drawing Sheets

(56) References Cited

U.S. PATENT DOCUMENTS

| | | | | |
|---|---|---|---|---|
| 2004/0182597 | A1 | 9/2004 | Smith et al. | |
| 2007/0193767 | A1 | 8/2007 | Guery et al. | |
| 2009/0197000 | A1 | 8/2009 | Limerkens et al. | |
| 2010/0078194 | A1* | 4/2010 | Bhatt | C08K 3/041 977/932 |
| 2010/0086268 | A1* | 4/2010 | Reyes | C08K 5/5205 385/100 |
| 2012/0261158 | A1 | 10/2012 | Daniel et al. | |
| 2012/0273253 | A1* | 11/2012 | Nilsson | C08F 6/001 174/120 SC |
| 2013/0167502 | A1* | 7/2013 | Wilson | H01B 3/40 264/165 |
| 2014/0107311 | A1 | 4/2014 | Farkas | |
| 2016/0078983 | A1* | 3/2016 | Gundel | H01B 7/0823 174/102 R |
| 2019/0139677 | A1* | 5/2019 | Kaga | H01B 3/447 |
| 2020/0234851 | A1* | 7/2020 | Yu | H01B 13/06 |

OTHER PUBLICATIONS

Sato et al., Development of a Low Sag Aluminum Conductor Carbon Fiber Reinforced for Transmission Lines, Cigré Report 22-203, 2002 ("Sato").

Carbon Black, Kirk-Othmer Encyclopedia of Chemical Technology. Vol. 4, 761-803 ("Carbon Black").

International Search Report & Written Opinion Issued in PCT Patent Application No. PCT/US2020/058221 Mailed Date: Mar. 15, 2021; 14 Pages.

Carbon Black, Kirk-Othmer Encyclopedia of Chemical Technology (2003) vol. 4, 761-803 ("Carbon Black").

Overhead Conductor Manual, 2nd Edition, 2007, pp. 1.1-1.5, 1.34, 1.36-1.37, and 140.141 (OHCM).

Standard for Tree Wire and Messenger Supported Spacer Cable, 2016, ANSI/ICEA S-121-733-2016 ("ANSI/ICEA Tree Wire Standard").

(Rosato et al., Concise Encyclopedia of Plastics, 2000, pp. 432 and 548 ("Rosato").

A. Tewarson, Flammability of polymers, Chapter 11 in Plastics and the Environment, John Wiley & Sons, Ltd, 2003, pp. 403-489 ("Tewarson").

Wunderlich et al., "A Study of Equilibrium Melting of Polyethylene," Macromolecules, (1977) 10(5): 906-913.

Mohammadi et al., "Investigating the equilibrium melting temperature of linear polyethylene using the non-linear Hoffman-Weeks approach," Polymer (2018) 146: 344-360.

Peacock, A. J., "Handbook of Polyethylene: Structures, Properties, and Applications," Marcel Dekker, Inc. (New York), 2000, pp. 15-19, 399-401.

Kao et al., "Crystallinity in chemically crosslinked low density polyethylenes: 1. Structural and fusion studies," Polymer (1986) 27: 1669-1678.

Ren et al., "Structures and impact strength variation of chemically crosslinked high-density polyethylene: effect of crosslinking density," RSC Adv. (2021) 11: 6791-6791.

Ahmad et al., The effect of chemical crosslinking on the properties of Rotomolded high density polyethylene, Journal of Applied Polymer Science (2024): 141:e54744, 1-15.

* cited by examiner

| Tree Wire (3-Layer, 15kV) | | | | | | | | | | | |
|---|---|---|---|---|---|---|---|---|---|---|---|
| Ex. No. | Size (AWG or kcmil) | Stranding | AL Strand Diameter (in) | # of Core Strands | Composite Core OD (in) | Conductor Diameter (in) | Covering Thickness (mils) | | | Cable O.D. (in) | Rated Strength (lb) |
| | | | | | | | Conductor Shield | Inner Layer | Outer Layer | | |
| 3.1 | 4 | 6/1 | 0.0834 | 1 | 0.0835 | 0.250 | 25 | 75 | 75 | 0.600 | 2,300 |
| 3.2 | 2 | 6/1 | 0.1052 | 1 | 0.1051 | 0.316 | 25 | 75 | 75 | 0.666 | 3,650 |
| 3.3 | 1/0 | 6/1 | 0.1327 | 1 | 0.1327 | 0.398 | 25 | 75 | 75 | 0.748 | 5,790 |
| 3.4 | 2/0 | 6/1 | 0.1489 | 1 | 0.1488 | 0.447 | 25 | 75 | 75 | 0.797 | 7,280 |
| 3.5 | 4/0 | 6/1 | 0.1878 | 1 | 0.1870 | 0.563 | 25 | 75 | 75 | 0.913 | 11,400 |
| 3.6 | 336.4 | 18/1 | 0.1367 | 1 | 0.1366 | 0.683 | 25 | 75 | 75 | 1.033 | 9,690 |
| 3.7 | 336.4 | 26/7 | 0.1137 | 7 | 0.2677 | 0.723 | 25 | 75 | 75 | 1.073 | 18,200 |
| 3.8 | 397.5 | 18/1 | 0.1486 | 1 | 0.1488 | 0.743 | 25 | 75 | 75 | 1.093 | 11,500 |
| 3.9 | 397.5 | 26/7 | 0.1236 | 7 | 0.2874 | 0.782 | 25 | 75 | 75 | 1.132 | 21,200 |
| 3.10 | 477.0 | 30/7 | 0.1261 | 7 | 0.2677 | 0.772 | 25 | 75 | 75 | 1.122 | 20,600 |
| 3.11 | 556.5 | 24/7 | 0.1523 | 7 | 0.3071 | 0.916 | 25 | 75 | 75 | 1.266 | 25,700 |
| 3.12 | 4.0 | 6/1 | 0.0834 | 1 | 0.0835 | 0.250 | 15 | 75 | 75 | 0.580 | 2,450 |
| 3.13 | 4.0 | 7/1 | 0.0772 | 1 | 0.1024 | 0.257 | 15 | 75 | 75 | 0.587 | 3,310 |
| 3.14 | 2.0 | 6/1 | 0.1052 | 1 | 0.1051 | 0.316 | 15 | 75 | 75 | 0.646 | 3,890 |
| 3.15 | 2.0 | 7/1 | 0.0974 | 1 | 0.1299 | 0.325 | 15 | 75 | 75 | 0.655 | 5,310 |
| 3.16 | 1.0 | 6/1 | 0.1181 | 1 | 0.1181 | 0.354 | 15 | 75 | 75 | 0.684 | 4,910 |
| 3.17 | 1/0 | 6/1 | 0.1327 | 1 | 0.1327 | 0.398 | 15 | 75 | 75 | 0.728 | 6,160 |
| 3.18 | 2/0 | 6/1 | 0.1489 | 1 | 0.1488 | 0.447 | 15 | 75 | 75 | 0.777 | 7,750 |
| 3.19 | 3/0 | 6/1 | 0.1672 | 1 | 0.1667 | 0.501 | 15 | 75 | 75 | 0.831 | 9,670 |
| 3.20 | 4/0 | 6/1 | 0.1878 | 1 | 0.1886 | 0.564 | 15 | 75 | 75 | 0.894 | 12,200 |
| 3.21 | 266.8 | 18/1 | 0.1217 | 1 | 0.1247 | 0.612 | 15 | 75 | 75 | 0.942 | 8,460 |
| 3.22 | 266.8 | 24/7 | 0.1054 | 7 | 0.2088 | 0.630 | 15 | 75 | 75 | 0.960 | 12,800 |
| 3.23 | 266.8 | 26/7 | 0.1013 | 7 | 0.2385 | 0.644 | 15 | 75 | 75 | 0.974 | 15,300 |
| 3.24 | 266.8 | 30/7 | 0.0943 | 7 | 0.2874 | 0.665 | 15 | 75 | 75 | 0.995 | 20,000 |

FIG. 3

| | | | | | | | | | | | |
|---|---|---|---|---|---|---|---|---|---|---|---|
| 3.25 | 336.4 | 18/1 | 0.1367 | 1 | 0.1366 | 0.683 | 15 | 75 | 75 | 1.013 | 10,300 |
| 3.26 | 336.4 | 24/7 | 0.1184 | 7 | 0.2385 | 0.712 | 15 | 75 | 75 | 1.042 | 16,500 |
| 3.27 | 336.4 | 26/7 | 0.1137 | 7 | 0.2676 | 0.722 | 15 | 75 | 75 | 1.052 | 19,200 |
| 3.28 | 336.4 | 30/7 | 0.1059 | 7 | 0.3153 | 0.739 | 15 | 75 | 75 | 1.069 | 24,400 |
| 3.29 | 397.5 | 18/1 | 0.1486 | 1 | 0.1488 | 0.743 | 15 | 75 | 75 | 1.073 | 12,200 |
| 3.30 | 397.5 | 24/7 | 0.1287 | 7 | 0.2505 | 0.765 | 15 | 75 | 75 | 1.095 | 18,500 |
| 3.31 | 397.5 | 26/7 | 0.1236 | 7 | 0.2874 | 0.782 | 15 | 75 | 75 | 1.112 | 22,300 |
| 3.32 | 397.5 | 30/7 | 0.1151 | 7 | 0.3543 | 0.815 | 15 | 75 | 75 | 1.145 | 30,300 |
| 3.33 | 477.0 | 18/1 | 0.1628 | 1 | 0.1640 | 0.815 | 15 | 75 | 75 | 1.145 | 14,600 |
| 3.34 | 477.0 | 24/7 | 0.1410 | 7 | 0.2874 | 0.851 | 15 | 75 | 75 | 1.181 | 23,600 |
| 3.35 | 477.0 | 26/7 | 0.1354 | 7 | 0.3153 | 0.857 | 15 | 75 | 75 | 1.187 | 26,700 |
| 3.36 | 477.0 | 30/7 | 0.1261 | 7 | 0.3741 | 0.879 | 15 | 75 | 75 | 1.209 | 34,400 |
| 3.37 | 556.5 | 18/1 | 0.1758 | 1 | 0.1759 | 0.879 | 20 | 75 | 75 | 1.219 | 16,900 |
| 3.38 | 556.5 | 24/7 | 0.1523 | 7 | 0.3072 | 0.916 | 20 | 75 | 75 | 1.256 | 27,100 |
| 3.39 | 556.5 | 26/7 | 0.1463 | 7 | 0.3345 | 0.920 | 20 | 75 | 75 | 1.260 | 30,400 |
| 3.40 | 556.5 | 30/7 | 0.1362 | 7 | 0.4086 | 0.953 | 20 | 75 | 75 | 1.293 | 40,600 |
| 3.41 | 636.0 | 18/1 | 0.1880 | 1 | 0.1886 | 0.941 | 20 | 75 | 75 | 1.281 | 19,100 |
| 3.42 | 636.0 | 24/7 | 0.1628 | 7 | 0.3345 | 0.986 | 20 | 75 | 75 | 1.326 | 31,500 |
| 3.43 | 636.0 | 26/7 | 0.1564 | 7 | 0.3741 | 1.000 | 20 | 75 | 75 | 1.340 | 36,700 |
| 3.44 | 636.0 | 30/7 | 0.1456 | 7 | 0.4410 | 1.023 | 20 | 75 | 75 | 1.363 | 43,700 |
| 3.45 | 795.0 | 24/7 | 0.1820 | 7 | 0.3543 | 1.082 | 20 | 80 | 80 | 1.442 | 36,700 |
| 3.46 | 795.0 | 26/7 | 0.1749 | 7 | 0.4086 | 1.108 | 20 | 80 | 80 | 1.468 | 44,400 |
| 3.47 | 795.0 | 30/7 | 0.1628 | 7 | 0.4920 | 1.143 | 20 | 80 | 80 | 1.503 | 54,100 |
| 3.48 | 795.0 | 45/7 | 0.1329 | 7 | 0.2676 | 1.065 | 20 | 80 | 80 | 1.425 | 26,700 |

FIG. 3 (cont'd)

| Tree Wire (3-Layer, 25kV) | | | | | | | | | | | |
|---|---|---|---|---|---|---|---|---|---|---|---|
| Ex. No. | Size (AWG or kcmil) | Stranding | AL Strand Diameter (in) | # of Core Strands | Composite Core OD (in) | Conductor Diameter (in) | Covering Thickness (mils) | | | Cable O.D. (in) | Rated Strength (lb) |
| | | | | | | | Conductor Shield | Inner Layer | Outer Layer | | |
| 4.1 | 1/0 | 6/1 | 0.1327 | 1 | 0.1327 | 0.398 | 25 | 125 | 125 | 0.948 | 5,790 |
| 4.2 | 2/0 | 6/1 | 0.1489 | 1 | 0.1488 | 0.447 | 25 | 125 | 125 | 0.997 | 7,280 |
| 4.3 | 4/0 | 6/1 | 0.1878 | 1 | 0.1870 | 0.563 | 25 | 125 | 125 | 1.113 | 11,400 |
| 4.4 | 336.4 | 18/1 | 0.1367 | 1 | 0.1366 | 0.683 | 25 | 125 | 125 | 1.233 | 9,690 |
| 4.5 | 336.4 | 26/7 | 0.1137 | 7 | 0.2677 | 0.723 | 25 | 125 | 125 | 1.273 | 18,200 |
| 4.6 | 397.5 | 18/1 | 0.1486 | 1 | 0.1488 | 0.743 | 25 | 125 | 125 | 1.293 | 11,500 |
| 4.7 | 397.5 | 26/7 | 0.1236 | 7 | 0.2874 | 0.782 | 25 | 125 | 125 | 1.332 | 21,200 |
| 4.8 | 477.0 | 30/7 | 0.1261 | 7 | 0.2677 | 0.772 | 25 | 125 | 125 | 1.322 | 20,600 |
| 4.9 | 556.5 | 24/7 | 0.1523 | 7 | 0.3071 | 0.916 | 25 | 125 | 125 | 1.466 | 25,700 |
| 4.10 | 2.0 | 6/1 | 0.1052 | 1 | 0.1051 | 0.316 | 15 | 125 | 125 | 0.846 | 3,890 |
| 4.11 | 2.0 | 7/1 | 0.0974 | 1 | 0.1299 | 0.325 | 15 | 125 | 125 | 0.855 | 5,310 |
| 4.12 | 1.0 | 6/1 | 0.1181 | 1 | 0.1181 | 0.354 | 15 | 125 | 125 | 0.884 | 4,910 |
| 4.13 | 1/0 | 6/1 | 0.1327 | 1 | 0.1327 | 0.398 | 15 | 125 | 125 | 0.928 | 6,160 |
| 4.14 | 2/0 | 6/1 | 0.1489 | 1 | 0.1488 | 0.447 | 15 | 125 | 125 | 0.977 | 7,750 |
| 4.15 | 3/0 | 6/1 | 0.1672 | 1 | 0.1667 | 0.501 | 15 | 125 | 125 | 1.031 | 9,670 |
| 4.16 | 4/0 | 6/1 | 0.1878 | 1 | 0.1886 | 0.564 | 15 | 125 | 125 | 1.094 | 12,200 |
| 4.17 | 266.8 | 18/1 | 0.1217 | 1 | 0.1247 | 0.612 | 15 | 125 | 125 | 1.142 | 8,460 |
| 4.18 | 266.8 | 24/7 | 0.1054 | 7 | 0.2088 | 0.630 | 15 | 125 | 125 | 1.160 | 12,800 |
| 4.19 | 266.8 | 26/7 | 0.1013 | 7 | 0.2385 | 0.644 | 15 | 125 | 125 | 1.174 | 15,300 |
| 4.20 | 266.8 | 30/7 | 0.0943 | 7 | 0.2874 | 0.665 | 15 | 125 | 125 | 1.195 | 20,000 |
| 4.21 | 336.4 | 18/1 | 0.1367 | 1 | 0.1366 | 0.683 | 15 | 125 | 125 | 1.213 | 10,300 |
| 4.22 | 336.4 | 24/7 | 0.1184 | 7 | 0.2385 | 0.712 | 15 | 125 | 125 | 1.242 | 16,500 |

FIG. 4

| | | | | | | | | | | | |
|---|---|---|---|---|---|---|---|---|---|---|---|
| 4.23 | 336.4 | 26/7 | 0.1137 | 7 | 0.2676 | 0.722 | 15 | 125 | 125 | 1.252 | 19,200 |
| 4.24 | 336.4 | 30/7 | 0.1059 | 7 | 0.3153 | 0.739 | 15 | 125 | 125 | 1.269 | 24,400 |
| 4.25 | 397.5 | 18/1 | 0.1486 | 7 | 0.1488 | 0.743 | 15 | 125 | 125 | 1.273 | 12,200 |
| 4.26 | 397.5 | 24/7 | 0.1287 | 1 | 0.2505 | 0.765 | 15 | 125 | 125 | 1.295 | 18,500 |
| 4.27 | 397.5 | 26/7 | 0.1236 | 7 | 0.2874 | 0.782 | 15 | 125 | 125 | 1.312 | 22,300 |
| 4.28 | 397.5 | 30/7 | 0.1151 | 7 | 0.3543 | 0.815 | 15 | 125 | 125 | 1.345 | 30,300 |
| 4.29 | 477.0 | 18/1 | 0.1628 | 1 | 0.1640 | 0.815 | 15 | 125 | 125 | 1.345 | 14,600 |
| 4.30 | 477.0 | 24/7 | 0.1410 | 7 | 0.2874 | 0.851 | 15 | 125 | 125 | 1.381 | 23,600 |
| 4.31 | 477.0 | 26/7 | 0.1354 | 7 | 0.3153 | 0.857 | 15 | 125 | 125 | 1.387 | 26,700 |
| 4.32 | 477.0 | 30/7 | 0.1261 | 7 | 0.3741 | 0.879 | 15 | 125 | 125 | 1.409 | 34,400 |
| 4.33 | 556.5 | 18/1 | 0.1758 | 1 | 0.1759 | 0.879 | 20 | 125 | 125 | 1.419 | 16,900 |
| 4.34 | 556.5 | 24/7 | 0.1523 | 7 | 0.3072 | 0.916 | 20 | 125 | 125 | 1.456 | 27,100 |
| 4.35 | 556.5 | 26/7 | 0.1463 | 7 | 0.3345 | 0.920 | 20 | 125 | 125 | 1.460 | 30,400 |
| 4.36 | 556.5 | 30/7 | 0.1362 | 7 | 0.4086 | 0.953 | 20 | 125 | 125 | 1.493 | 40,600 |
| 4.37 | 636.0 | 18/1 | 0.1880 | 1 | 0.1886 | 0.941 | 20 | 125 | 125 | 1.481 | 19,100 |
| 4.38 | 636.0 | 24/7 | 0.1628 | 7 | 0.3345 | 0.986 | 20 | 125 | 125 | 1.526 | 31,500 |
| 4.39 | 636.0 | 26/7 | 0.1564 | 7 | 0.3741 | 1.000 | 20 | 125 | 125 | 1.540 | 36,700 |
| 4.40 | 636.0 | 30/7 | 0.1456 | 7 | 0.4410 | 1.023 | 20 | 125 | 125 | 1.563 | 43,700 |
| 4.41 | 795.0 | 24/7 | 0.1820 | 7 | 0.3543 | 1.082 | 20 | 125 | 125 | 1.622 | 36,700 |
| 4.42 | 795.0 | 26/7 | 0.1749 | 7 | 0.4086 | 1.108 | 20 | 125 | 125 | 1.648 | 44,400 |
| 4.43 | 795.0 | 30/7 | 0.1628 | 7 | 0.4920 | 1.143 | 20 | 125 | 125 | 1.683 | 54,100 |
| 4.44 | 795.0 | 45/7 | 0.1329 | 7 | 0.2676 | 1.065 | 20 | 125 | 125 | 1.605 | 26,700 |

FIG. 4 (cont'd)

| Tree Wire (3-Layer, 35kV) | | | | | | | | | | | |
|---|---|---|---|---|---|---|---|---|---|---|---|
| Ex. No. | Size (AWG or kcmil) | Stranding | AL Strand Diameter (in) | # of Core Strands | Composite Core OD (in) | Conductor Diameter (in) | Covering Thickness (mils) | | | Cable O.D. (in) | Rated Strength (lb) |
| | | | | | | | Conductor Shield | Inner Layer | Outer Layer | | |
| 5.1 | 1/0 | 6/1 | 0.1327 | 1 | 0.1327 | 0.398 | 25 | 175 | 125 | 1.048 | 5,790 |
| 5.2 | 2/0 | 6/1 | 0.1489 | 1 | 0.1488 | 0.447 | 25 | 175 | 125 | 1.097 | 7,280 |
| 5.3 | 4/0 | 6/1 | 0.1878 | 1 | 0.1870 | 0.563 | 25 | 175 | 125 | 1.213 | 11,400 |
| 5.4 | 336.4 | 18/1 | 0.1367 | 1 | 0.1366 | 0.683 | 25 | 175 | 125 | 1.333 | 9,690 |
| 5.5 | 336.4 | 26/7 | 0.1137 | 7 | 0.2677 | 0.723 | 25 | 175 | 125 | 1.373 | 18,200 |
| 5.6 | 397.5 | 18/1 | 0.1486 | 1 | 0.1488 | 0.743 | 25 | 175 | 125 | 1.393 | 11,500 |
| 5.7 | 397.5 | 26/7 | 0.1236 | 7 | 0.2874 | 0.782 | 25 | 175 | 125 | 1.432 | 21,200 |
| 5.8 | 477.0 | 30/7 | 0.1261 | 7 | 0.2677 | 0.772 | 25 | 175 | 125 | 1.422 | 20,600 |
| 5.9 | 556.5 | 24/7 | 0.1523 | 7 | 0.3071 | 0.916 | 25 | 175 | 125 | 1.566 | 25,700 |
| 5.10 | 1/0 | 6/1 | 0.1327 | 1 | 0.1327 | 0.398 | 15 | 175 | 125 | 1.028 | 6,160 |
| 5.11 | 2/0 | 6/1 | 0.1489 | 1 | 0.1488 | 0.447 | 15 | 175 | 125 | 1.077 | 7,750 |
| 5.12 | 3/0 | 6/1 | 0.1672 | 1 | 0.1667 | 0.501 | 15 | 175 | 125 | 1.131 | 9,670 |
| 5.13 | 4/0 | 6/1 | 0.1878 | 1 | 0.1886 | 0.564 | 15 | 175 | 125 | 1.194 | 12,200 |
| 5.14 | 266.8 | 18/1 | 0.1217 | 1 | 0.1247 | 0.612 | 15 | 175 | 125 | 1.242 | 8,460 |
| 5.15 | 266.8 | 24/7 | 0.1054 | 7 | 0.2088 | 0.630 | 15 | 175 | 125 | 1.260 | 12,800 |
| 5.16 | 266.8 | 26/7 | 0.1013 | 7 | 0.2385 | 0.644 | 15 | 175 | 125 | 1.274 | 15,300 |
| 5.17 | 266.8 | 30/7 | 0.0943 | 7 | 0.2874 | 0.665 | 15 | 175 | 125 | 1.295 | 20,000 |
| 5.18 | 336.4 | 18/1 | 0.1367 | 1 | 0.1366 | 0.683 | 15 | 175 | 125 | 1.313 | 10,300 |
| 5.19 | 336.4 | 24/7 | 0.1184 | 7 | 0.2385 | 0.712 | 15 | 175 | 125 | 1.342 | 16,500 |
| 5.20 | 336.4 | 26/7 | 0.1137 | 7 | 0.2676 | 0.722 | 15 | 175 | 125 | 1.352 | 19,200 |
| 5.21 | 336.4 | 30/7 | 0.1059 | 7 | 0.3153 | 0.739 | 15 | 175 | 125 | 1.369 | 24,400 |
| 5.22 | 397.5 | 18/1 | 0.1486 | 1 | 0.1488 | 0.743 | 15 | 175 | 125 | 1.373 | 12,200 |

FIG. 5

| | | | | | | | | | | | |
|---|---|---|---|---|---|---|---|---|---|---|---|
| 5.23 | 397.5 | 24/7 | 0.1287 | 7 | 0.2505 | 0.765 | 15 | 175 | 125 | 1.395 | 18,500 |
| 5.24 | 397.5 | 26/7 | 0.1236 | 7 | 0.2874 | 0.782 | 15 | 175 | 125 | 1.412 | 22,300 |
| 5.25 | 397.5 | 30/7 | 0.1151 | 7 | 0.3543 | 0.815 | 15 | 175 | 125 | 1.445 | 30,300 |
| 5.26 | 477.0 | 18/1 | 0.1628 | 1 | 0.1640 | 0.815 | 15 | 175 | 125 | 1.445 | 14,600 |
| 5.27 | 477.0 | 24/7 | 0.1410 | 7 | 0.2874 | 0.851 | 15 | 175 | 125 | 1.481 | 23,600 |
| 5.28 | 477.0 | 26/7 | 0.1354 | 7 | 0.3153 | 0.857 | 15 | 175 | 125 | 1.487 | 26,700 |
| 5.29 | 477.0 | 30/7 | 0.1261 | 7 | 0.3741 | 0.879 | 15 | 175 | 125 | 1.509 | 34,400 |
| 5.30 | 556.5 | 18/1 | 0.1758 | 1 | 0.1759 | 0.879 | 20 | 175 | 125 | 1.519 | 16,900 |
| 5.31 | 556.5 | 24/7 | 0.1523 | 7 | 0.3072 | 0.916 | 20 | 175 | 125 | 1.556 | 27,100 |
| 5.32 | 556.5 | 26/7 | 0.1463 | 7 | 0.3345 | 0.920 | 20 | 175 | 125 | 1.560 | 30,400 |
| 5.33 | 556.5 | 30/7 | 0.1362 | 7 | 0.4086 | 0.953 | 20 | 175 | 125 | 1.593 | 40,600 |
| 5.34 | 636.0 | 18/1 | 0.1880 | 1 | 0.1886 | 0.941 | 20 | 175 | 125 | 1.581 | 19,100 |
| 5.35 | 636.0 | 24/7 | 0.1628 | 7 | 0.3345 | 0.986 | 20 | 175 | 125 | 1.626 | 31,500 |
| 5.36 | 636.0 | 26/7 | 0.1564 | 7 | 0.3741 | 1.000 | 20 | 175 | 125 | 1.640 | 36,700 |
| 5.37 | 636.0 | 30/7 | 0.1456 | 7 | 0.4410 | 1.023 | 20 | 175 | 125 | 1.663 | 43,700 |
| 5.38 | 795.0 | 24/7 | 0.1820 | 7 | 0.3543 | 1.082 | 20 | 175 | 125 | 1.722 | 36,700 |
| 5.39 | 795.0 | 26/7 | 0.1749 | 7 | 0.4086 | 1.108 | 20 | 175 | 125 | 1.748 | 44,400 |
| 5.40 | 795.0 | 30/7 | 0.1628 | 7 | 0.4920 | 1.143 | 20 | 175 | 125 | 1.783 | 54,100 |
| 5.41 | 795.0 | 45/7 | 0.1329 | 7 | 0.2676 | 1.065 | 20 | 175 | 125 | 1.705 | 26,700 |

FIG. 5 (cont'd)

| Tree Wire (3-Layer, 46kV) | | | | | | | | | | | |
|---|---|---|---|---|---|---|---|---|---|---|---|
| Ex. No. | Size (AWG or kcmil) | Stranding | AL Strand Diameter (in) | # of Core Strands | Composite Core OD (in) | Conductor Diameter (in) | Covering Thickness (mils) | | | Cable O.D. (in) | Rated Strength (lb) |
| | | | | | | | Conductor Shield | Inner Layer | Outer Layer | | |
| 6.1 | 1/0 | 6/1 | 0.1327 | 1 | 0.1327 | 0.398 | 20 | 225 | 175 | 1.238 | 6,160 |
| 6.2 | 2/0 | 6/1 | 0.1489 | 1 | 0.1488 | 0.447 | 20 | 225 | 175 | 1.287 | 7,750 |
| 6.3 | 3/0 | 6/1 | 0.1672 | 1 | 0.1667 | 0.501 | 20 | 225 | 175 | 1.341 | 9,670 |
| 6.4 | 4/0 | 6/1 | 0.1878 | 1 | 0.1886 | 0.564 | 20 | 225 | 175 | 1.404 | 12,200 |
| 6.5 | 266.8 | 18/1 | 0.1217 | 1 | 0.1247 | 0.612 | 20 | 225 | 175 | 1.452 | 8,460 |
| 6.6 | 266.8 | 24/7 | 0.1054 | 7 | 0.2088 | 0.630 | 20 | 225 | 175 | 1.470 | 12,800 |
| 6.7 | 266.8 | 26/7 | 0.1013 | 7 | 0.2385 | 0.644 | 20 | 225 | 175 | 1.484 | 15,300 |
| 6.8 | 266.8 | 30/7 | 0.0943 | 7 | 0.2874 | 0.665 | 20 | 225 | 175 | 1.505 | 20,000 |
| 6.9 | 336.4 | 18/1 | 0.1367 | 1 | 0.1366 | 0.683 | 20 | 225 | 175 | 1.523 | 10,300 |
| 6.10 | 336.4 | 24/7 | 0.1184 | 7 | 0.2385 | 0.712 | 20 | 225 | 175 | 1.552 | 16,500 |
| 6.11 | 336.4 | 26/7 | 0.1137 | 7 | 0.2676 | 0.722 | 20 | 225 | 175 | 1.562 | 19,200 |
| 6.12 | 336.4 | 30/7 | 0.1059 | 7 | 0.3153 | 0.739 | 20 | 225 | 175 | 1.579 | 24,400 |
| 6.13 | 397.5 | 18/1 | 0.1486 | 1 | 0.1488 | 0.743 | 20 | 225 | 175 | 1.583 | 12,200 |
| 6.14 | 397.5 | 24/7 | 0.1287 | 7 | 0.2505 | 0.765 | 20 | 225 | 175 | 1.605 | 18,500 |
| 6.15 | 397.5 | 26/7 | 0.1236 | 7 | 0.2874 | 0.782 | 20 | 225 | 175 | 1.622 | 22,300 |
| 6.16 | 397.5 | 30/7 | 0.1151 | 7 | 0.3543 | 0.815 | 20 | 225 | 175 | 1.655 | 30,300 |
| 6.17 | 477.0 | 18/1 | 0.1628 | 1 | 0.1640 | 0.815 | 20 | 225 | 175 | 1.655 | 14,600 |
| 6.18 | 477.0 | 24/7 | 0.1410 | 7 | 0.2874 | 0.851 | 20 | 225 | 175 | 1.691 | 23,600 |
| 6.19 | 477.0 | 26/7 | 0.1354 | 7 | 0.3153 | 0.857 | 20 | 225 | 175 | 1.697 | 26,700 |
| 6.20 | 477.0 | 30/7 | 0.1261 | 7 | 0.3741 | 0.879 | 20 | 225 | 175 | 1.719 | 34,400 |
| 6.21 | 556.5 | 18/1 | 0.1758 | 1 | 0.1759 | 0.879 | 20 | 225 | 175 | 1.719 | 16,900 |
| 6.22 | 556.5 | 24/7 | 0.1523 | 7 | 0.3072 | 0.916 | 20 | 225 | 175 | 1.756 | 27,100 |

FIG. 6

| | | | | | | | | | | | |
|---|---|---|---|---|---|---|---|---|---|---|---|
| 6.23 | 556.5 | 26/7 | 0.1463 | 7 | 0.3345 | 0.920 | 20 | 225 | 175 | 1.760 | 30,400 |
| 6.24 | 556.5 | 30/7 | 0.1362 | 7 | 0.4086 | 0.953 | 20 | 225 | 175 | 1.793 | 40,600 |
| 6.25 | 636.0 | 18/1 | 0.1880 | 1 | 0.1886 | 0.941 | 20 | 225 | 175 | 1.781 | 19,100 |
| 6.26 | 636.0 | 24/7 | 0.1628 | 7 | 0.3345 | 0.986 | 20 | 225 | 175 | 1.826 | 31,500 |
| 6.27 | 636.0 | 26/7 | 0.1564 | 7 | 0.3741 | 1.000 | 20 | 225 | 175 | 1.840 | 36,700 |
| 6.28 | 636.0 | 30/7 | 0.1456 | 7 | 0.4410 | 1.023 | 20 | 225 | 175 | 1.863 | 43,700 |
| 6.29 | 795.0 | 24/7 | 0.1820 | 7 | 0.3543 | 1.082 | 20 | 225 | 175 | 1.922 | 36,700 |
| 6.30 | 795.0 | 26/7 | 0.1749 | 7 | 0.4086 | 1.108 | 20 | 225 | 175 | 1.948 | 44,400 |
| 6.31 | 795.0 | 30/7 | 0.1628 | 7 | 0.4920 | 1.143 | 20 | 225 | 175 | 1.983 | 54,100 |
| 6.32 | 795.0 | 45/7 | 0.1329 | 7 | 0.2676 | 1.065 | 20 | 225 | 175 | 1.905 | 26,700 |

FIG. 6 (cont'd)

Tree Wire (3-Layer, 69kV)

| Ex. No. | Size (AWG or kcmil) | Stranding | AL Strand Diameter (in) | # of Core Strands | Composite Core OD (in) | Conductor Diameter (in) | Covering Thickness (mils) | | | Cable O.D. (in) | Rated Strength (lb) |
|---|---|---|---|---|---|---|---|---|---|---|---|
| | | | | | | | Conductor Shield | Inner Layer | Outer Layer | | |
| 7.1 | 4/0 | 6/1 | 0.1878 | 1 | 0.1886 | 0.564 | 20 | 250 | 250 | 1.604 | 12,200 |
| 7.2 | 266.8 | 18/1 | 0.1217 | 1 | 0.1247 | 0.612 | 20 | 250 | 250 | 1.652 | 8,460 |
| 7.3 | 266.8 | 24/7 | 0.1054 | 7 | 0.2088 | 0.630 | 20 | 250 | 250 | 1.670 | 12,800 |
| 7.4 | 266.8 | 26/7 | 0.1013 | 7 | 0.2385 | 0.644 | 20 | 250 | 250 | 1.684 | 15,300 |
| 7.5 | 266.8 | 30/7 | 0.0943 | 7 | 0.2874 | 0.665 | 20 | 250 | 250 | 1.705 | 20,000 |
| 7.6 | 336.4 | 18/1 | 0.1367 | 1 | 0.1366 | 0.683 | 20 | 250 | 250 | 1.723 | 10,300 |
| 7.7 | 336.4 | 24/7 | 0.1184 | 7 | 0.2385 | 0.712 | 20 | 250 | 250 | 1.752 | 16,500 |
| 7.8 | 336.4 | 26/7 | 0.1137 | 7 | 0.2676 | 0.722 | 20 | 250 | 250 | 1.762 | 19,200 |
| 7.9 | 336.4 | 30/7 | 0.1059 | 7 | 0.3153 | 0.739 | 20 | 250 | 250 | 1.779 | 24,400 |
| 7.10 | 397.5 | 18/1 | 0.1486 | 1 | 0.1488 | 0.743 | 20 | 250 | 250 | 1.783 | 12,200 |
| 7.11 | 397.5 | 24/7 | 0.1287 | 7 | 0.2505 | 0.765 | 20 | 250 | 250 | 1.805 | 18,500 |
| 7.12 | 397.5 | 26/7 | 0.1236 | 7 | 0.2874 | 0.782 | 20 | 250 | 250 | 1.822 | 22,300 |
| 7.13 | 397.5 | 30/7 | 0.1151 | 7 | 0.3543 | 0.815 | 20 | 250 | 250 | 1.855 | 30,300 |
| 7.14 | 477.0 | 18/1 | 0.1628 | 1 | 0.1640 | 0.815 | 20 | 250 | 250 | 1.855 | 14,600 |
| 7.15 | 477.0 | 24/7 | 0.1410 | 7 | 0.2874 | 0.851 | 20 | 250 | 250 | 1.891 | 23,600 |
| 7.16 | 477.0 | 26/7 | 0.1354 | 7 | 0.3153 | 0.857 | 20 | 250 | 250 | 1.897 | 26,700 |
| 7.17 | 477.0 | 30/7 | 0.1261 | 7 | 0.3741 | 0.879 | 20 | 250 | 250 | 1.919 | 34,400 |
| 7.18 | 556.5 | 18/1 | 0.1758 | 1 | 0.1759 | 0.879 | 20 | 250 | 250 | 1.919 | 16,900 |
| 7.19 | 556.5 | 24/7 | 0.1523 | 7 | 0.3072 | 0.916 | 20 | 250 | 250 | 1.956 | 27,100 |
| 7.20 | 556.5 | 26/7 | 0.1463 | 7 | 0.3345 | 0.920 | 20 | 250 | 250 | 1.960 | 30,400 |
| 7.21 | 556.5 | 30/7 | 0.1362 | 7 | 0.4086 | 0.953 | 20 | 250 | 250 | 1.993 | 40,600 |
| 7.22 | 636.0 | 18/1 | 0.1880 | 1 | 0.1886 | 0.941 | 20 | 250 | 250 | 1.981 | 19,100 |

FIG. 7

| | | | | | | | | | | | |
|---|---|---|---|---|---|---|---|---|---|---|---|
| 7.23 | 636.0 | 24/7 | 0.1628 | 7 | 0.3345 | 0.986 | 20 | 250 | 250 | 2.026 | 31,500 |
| 7.24 | 636.0 | 26/7 | 0.1564 | 7 | 0.3741 | 1.000 | 20 | 250 | 250 | 2.040 | 36,700 |
| 7.25 | 636.0 | 30/7 | 0.1456 | 7 | 0.4410 | 1.023 | 20 | 250 | 250 | 2.063 | 43,700 |
| 7.26 | 795.0 | 24/7 | 0.1820 | 7 | 0.3543 | 1.082 | 20 | 250 | 250 | 2.122 | 36,700 |
| 7.27 | 795.0 | 26/7 | 0.1749 | 7 | 0.4086 | 1.108 | 20 | 250 | 250 | 2.148 | 44,400 |
| 7.28 | 795.0 | 30/7 | 0.1628 | 7 | 0.4920 | 1.143 | 20 | 250 | 250 | 2.183 | 54,100 |
| 7.29 | 795.0 | 45/7 | 0.1329 | 7 | 0.2676 | 1.065 | 20 | 250 | 250 | 2.105 | 26,700 |

FIG. 7 (cont'd)

| Tree Wire (3-Layer, 115kV) | | | | | | | | | | | |
|---|---|---|---|---|---|---|---|---|---|---|---|
| Ex. No. | Size (AWG or kcmil) | Stranding | AL Strand Diameter (in) | # of Core Strands | Composite Core OD (in) | Conductor Diameter (in) | Covering Thickness (mils) | | | Cable O.D. (in) | Rated Strength (lb) |
| | | | | | | | Conductor Shield | Inner Layer | Outer Layer | | |
| 8.1 | 336.4 | 18/1 | 0.1367 | 1 | 0.1366 | 0.683 | 20 | 320 | 310 | 1.983 | 10,300 |
| 8.2 | 336.4 | 24/7 | 0.1184 | 7 | 0.2385 | 0.712 | 20 | 320 | 310 | 2.012 | 16,500 |
| 8.3 | 336.4 | 26/7 | 0.1137 | 7 | 0.2676 | 0.722 | 20 | 320 | 310 | 2.022 | 19,200 |
| 8.4 | 336.4 | 30/7 | 0.1059 | 7 | 0.3153 | 0.739 | 20 | 320 | 310 | 2.039 | 24,400 |
| 8.5 | 397.5 | 18/1 | 0.1486 | 1 | 0.1488 | 0.743 | 20 | 320 | 310 | 2.043 | 12,200 |
| 8.6 | 397.5 | 24/7 | 0.1287 | 7 | 0.2505 | 0.765 | 20 | 320 | 310 | 2.065 | 18,500 |
| 8.7 | 397.5 | 26/7 | 0.1236 | 7 | 0.2874 | 0.782 | 20 | 320 | 310 | 2.082 | 22,300 |
| 8.8 | 397.5 | 30/7 | 0.1151 | 7 | 0.3543 | 0.815 | 20 | 320 | 310 | 2.115 | 30,300 |
| 8.9 | 477.0 | 18/1 | 0.1628 | 1 | 0.1640 | 0.815 | 20 | 320 | 310 | 2.115 | 14,600 |
| 8.10 | 477.0 | 24/7 | 0.1410 | 7 | 0.2874 | 0.851 | 20 | 320 | 310 | 2.151 | 23,600 |
| 8.11 | 477.0 | 26/7 | 0.1354 | 7 | 0.3153 | 0.857 | 20 | 320 | 310 | 2.157 | 26,700 |
| 8.12 | 477.0 | 30/7 | 0.1261 | 7 | 0.3741 | 0.879 | 20 | 320 | 310 | 2.179 | 34,400 |
| 8.13 | 556.5 | 18/1 | 0.1758 | 1 | 0.1759 | 0.879 | 20 | 320 | 310 | 2.179 | 16,900 |
| 8.14 | 556.5 | 24/7 | 0.1523 | 7 | 0.3072 | 0.916 | 20 | 320 | 310 | 2.216 | 27,100 |
| 8.15 | 556.5 | 26/7 | 0.1463 | 7 | 0.3345 | 0.920 | 20 | 320 | 310 | 2.220 | 30,400 |
| 8.16 | 556.5 | 30/7 | 0.1362 | 7 | 0.4086 | 0.953 | 20 | 320 | 310 | 2.253 | 40,600 |
| 8.17 | 636.0 | 18/1 | 0.1880 | 1 | 0.1886 | 0.941 | 20 | 320 | 310 | 2.241 | 19,100 |
| 8.18 | 636.0 | 24/7 | 0.1628 | 7 | 0.3345 | 0.986 | 20 | 320 | 310 | 2.286 | 31,500 |
| 8.19 | 636.0 | 26/7 | 0.1564 | 7 | 0.3741 | 1.000 | 20 | 320 | 310 | 2.300 | 36,700 |
| 8.20 | 636.0 | 30/7 | 0.1456 | 7 | 0.4410 | 1.023 | 20 | 320 | 310 | 2.323 | 43,700 |
| 8.21 | 795.0 | 24/7 | 0.1820 | 7 | 0.3543 | 1.082 | 20 | 320 | 310 | 2.382 | 36,700 |
| 8.22 | 795.0 | 26/7 | 0.1749 | 7 | 0.4086 | 1.108 | 20 | 320 | 310 | 2.408 | 44,400 |
| 8.23 | 795.0 | 30/7 | 0.1628 | 7 | 0.4920 | 1.143 | 20 | 320 | 310 | 2.443 | 54,100 |
| 8.24 | 795.0 | 45/7 | 0.1329 | 7 | 0.2676 | 1.065 | 20 | 320 | 310 | 2.365 | 26,700 |

FIG. 8

LOW SAG TREE WIRE

RELATED APPLICATION

This application claims priority to U.S. Provisional Patent Application No. 62/929,516, filed on Nov. 1, 2019, the subject matter of which is incorporated herein by reference.

SUMMARY

Disclosed herein is a tree wire and a method of preparing the same. The tree wire disclosed herein has an improved ampacity compared to a conventional ACSR tree wire, as well as reduced sag compared to a conventional ACSR bare conductor and/or ACSR tree wire.

BACKGROUND

Over the last several years, both the frequency and intensity of wildfires in the Western United States have been on the rise. Often times, these fires are started by intermittent contact between overhead electrical power lines and surrounding vegetation. Less frequently, wildfires are started by contact between overhead electrical power lines and wildlife. Wildfires started in this manner have led to the loss of hundreds of lives, thousands of homes, and billions of dollars of economic value. Electrical utilities are routinely blamed for these losses, and the ensuing liability has led to the financial ruin of numerous companies.

To prevent wildfires started by electrical power infrastructure, utilities have taken two general approaches: first, when weather conditions increase the likelihood of wildfire initiation, utilities have begun de-energizing their system, turning off power to millions of individuals for an extended period of time. The second mitigation approach involves the hardening of the electrical transmission and distribution systems through extensive vegetation management and the use of materials that are less likely to initiate wildfires.

The most common approach used by utilities is to replace bare overhead distribution conductors with a covered conductor referred to as tree wire. The insulating material used in tree wire significantly reduces the chance of wildfire initiation when there is intermittent contact between the electrical conductors and surrounding vegetation. Utilities are actively replacing bare distribution conductor with tree wire to improve their wildfire initiation posture, but a key drawback to conventional tree wire makes it unclear the effectiveness of this approach. Specifically, the additional weight of the covering material in a traditional tree wire causes the product to sag more than the bare conductor it is replacing. The additional sag leads to reduced clearance to vegetation in most scenarios. While the ability to withstand intermittent contact is improved with the use of tree wire, the likelihood of contact is also increased due to the additional sag.

The embodiment disclosed herein eliminates the need for the aforementioned tradeoff; that is, the additional weight of the covering material is more than offset by the improved performance of the core material used. When the steel core wire used in conventional tree wire is replaced with a carbon fiber composite core, the resulting sag is the same as or less than the sag seen with the original bare conductor. Because of this, the embodiment disclosed herein is able to withstand intermittent contact with vegetation like a conventional tree wire, and at the same time is less likely to come in contact with vegetation because of its improved sag performance.

BRIEF DESCRIPTION OF THE DRAWINGS

The foregoing and other objects, features and advantages of the embodiment and methods disclosed herein will be apparent from the following description of particular embodiments thereof, as illustrated in the accompanying drawings. The drawings are not necessarily to scale, emphasis instead being placed upon illustrating the principles of the embodiments and methods disclosed herein.

FIG. 3 identifies characteristics of exemplified tree wire embodiments (viz., Example Nos. 3.1-3.48) having a voltage rating of 15 kV.

FIG. 4 identifies characteristics of exemplified tree wire embodiments (viz., Example Nos. 4.1-4.44) having a voltage rating of 25 kV.

FIG. 5 identifies characteristics of exemplified tree wire embodiments (viz., Example Nos. 5.1-5.41) having a voltage rating of 35 kV.

FIG. 6 identifies characteristics of exemplified tree wire embodiments (viz., Example Nos. 6.1-6.32) having a voltage rating of 46 kV.

FIG. 7 identifies characteristics of exemplified tree wire embodiments (viz., Example Nos. 7.1-7.29) having a voltage rating of 69 kV.

FIG. 8 identifies characteristics of exemplified tree wire embodiments (viz., Example Nos. 8.1-8.24) having a voltage rating of 115 kV.

DETAILED DESCRIPTION

Figure 1A:
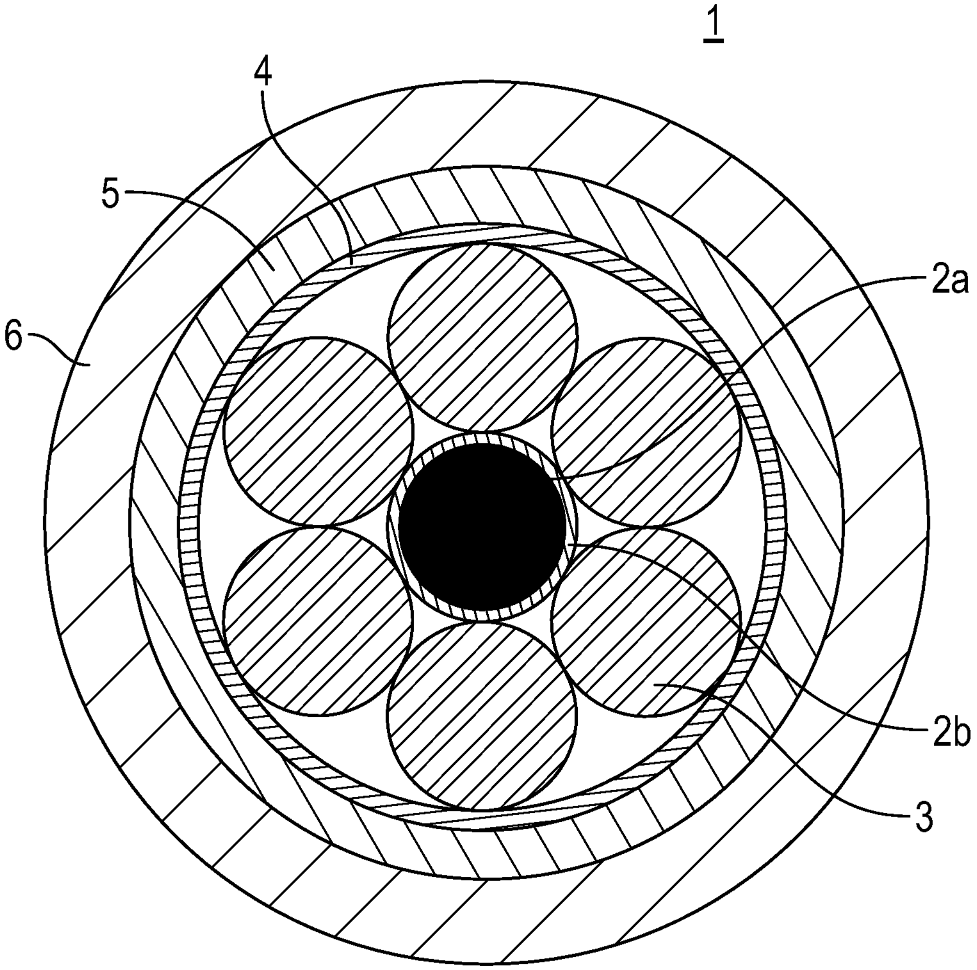
FIG. 1A represents a cross-sectional view of a tree-wire.

The information that follows describes embodiments with reference to the accompanying figures, in which preferred embodiments are shown. The foregoing may, however, be embodied in many different forms and should not be construed as limited to the illustrated embodiments set forth herein.

The phrase “a” or “an” entity as used herein refers to one or more of that entity.

The terms “optional” or “optionally” as used herein means that a subsequently described element, event, or circumstance may but need not occur, and that the description includes instances where the event or circumstance occurs and instances in which it does not.

References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, unless otherwise indicated or made clear from the context, the term “or” should generally be understood to mean “and/or” and, similarly, the term “and” should generally be understood to mean “and/or.”

Recitation of ranges of values herein are not intended to be limiting, referring instead individually to any and all values falling within the range, unless otherwise indicated herein, and each separate value within such a range is incorporated into the specification as if it were individually recited herein.

The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "upper," "lower," "below," and the like, are words of convenience and are not to be construed as implying a positional or chronological order or otherwise limiting any corresponding element unless expressly stated otherwise.

The information that follows details various embodiments of the disclosure. For the avoidance of doubt, it is specifically intended that any particular feature(s) described individually in any one of these paragraphs (or part thereof) may be combined with one or more other features described in one or more of the remaining paragraphs (or part thereof). In other words, it is explicitly intended that the features described below individually in each paragraph (or part thereof) represent aspects of the disclosure that may be taken in isolation and/or combined with other aspects of the disclosure. The skilled person will appreciate that the claimed subject matter extends to such combinations of features and that these have not been recited in detail here in the interest of brevity.

Disclosed herein is a tree wire, comprising: (a) a composite core comprised of at least one capped strand including a first resin supporting a matrix of carbon fibers and a capping layer including a second resin disposed on the surface of the first resin; (b) a plurality of aluminum strands disposed on the periphery of the composite core; and (c) a covering system comprising (c-1) optionally, a conductor shield including a third resin and an ionic substance dispersed therein, where the conductor shield is disposed on the periphery of the plurality of aluminum strands; and (c-2) a covering layer comprising a fourth resin, a fifth resin, or a combination thereof, where the covering layer is disposed on the periphery of the plurality of aluminum strands (b), or, if present, the periphery of conductor shield (c-1), wherein the tree wire has a voltage rating of from about 15 kV to about 115 kV and a rated strength of from about 2,300 lbs. to about 55,000 lbs.

Figure 1B:
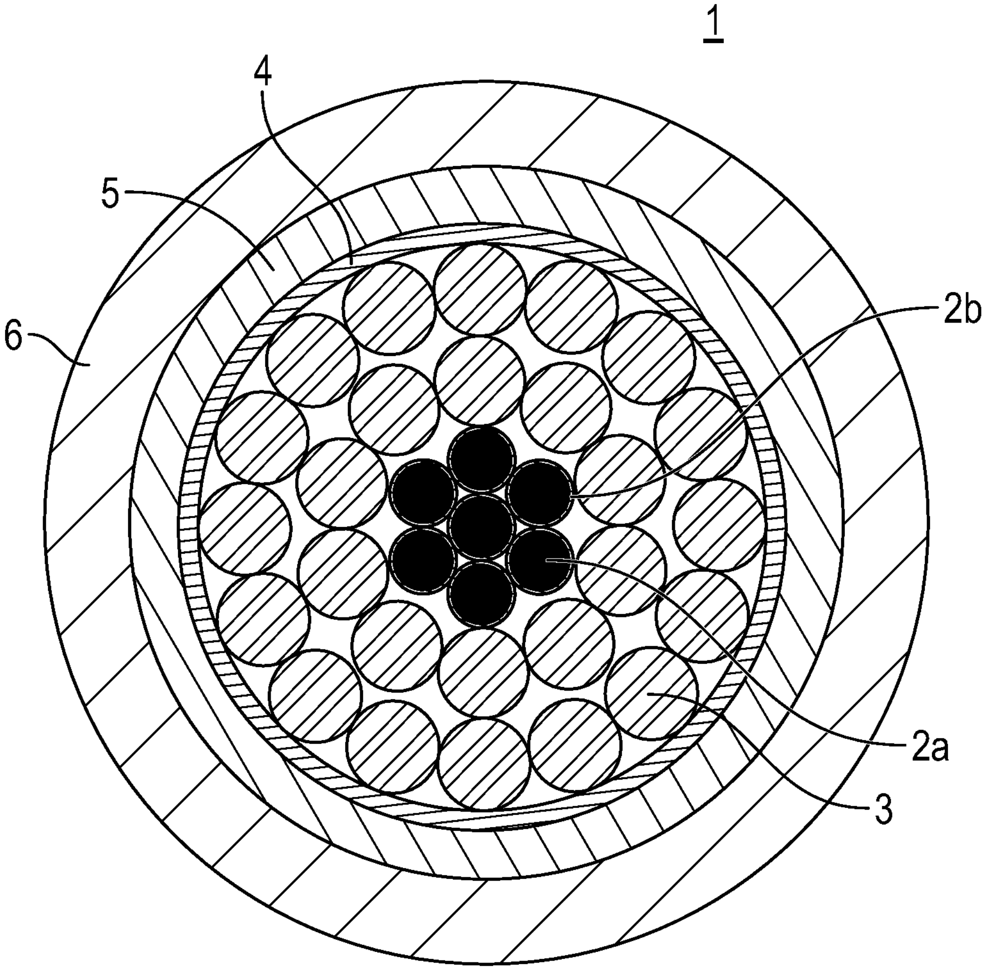
FIG. 1B represents a cross-sectional view of a tree wire.

FIG. 1 represents a cross-sectional view of an exemplary tree wire 1. From this view, it may be seen that the exemplary tree wire comprises: (a) a composite core comprised of at least one capped strand including a first resin supporting a matrix of carbon fibers (2*a*) and a capping layer (2*b*), (*b*) a plurality of aluminum strands 3 disposed on the periphery of the composite core, and (c) a covering system comprising (c-1) optionally, a conductor shield 4 disposed on the periphery of the plurality of conductors 3; (c-2) a covering layer, which comprises an inner covering layer 5 disposed on the periphery of the conductor shield 4; and (e) an outer covering layer 6 disposed on the periphery of the inner covering layer 5.

Figure 2A:
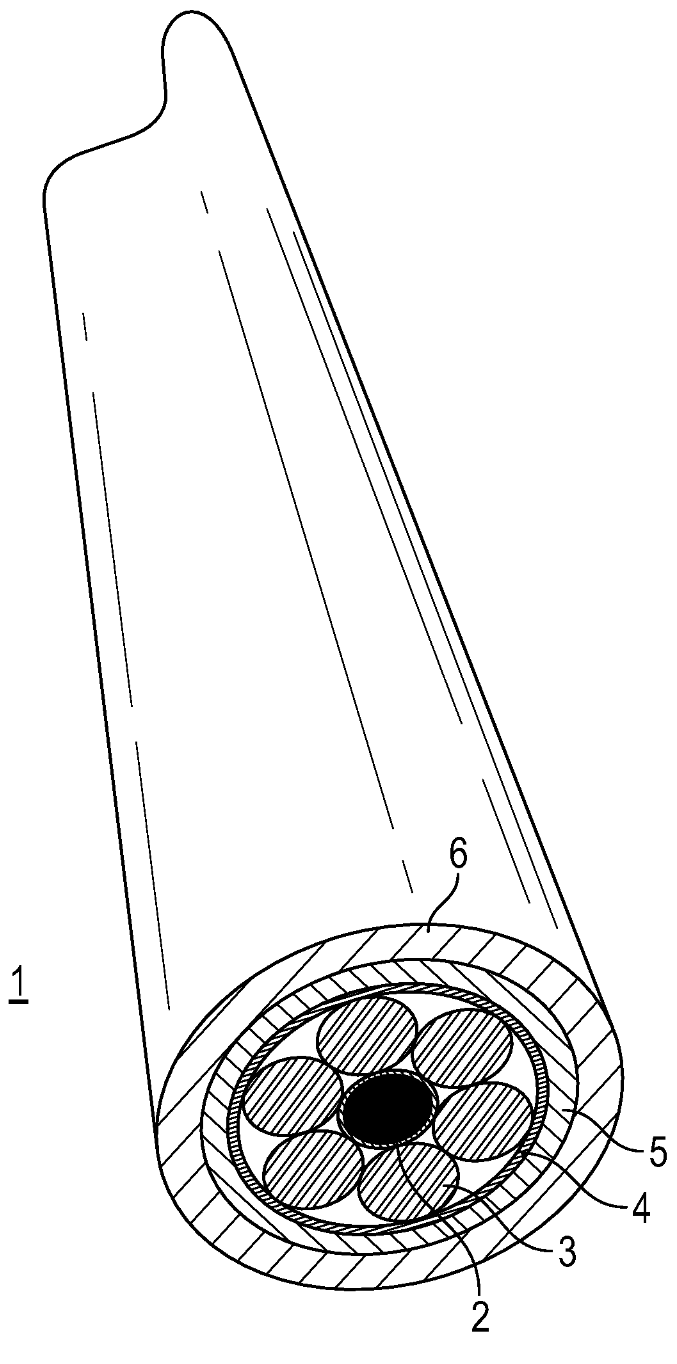
FIG. 2A represents a view of a length of tree-wire.
Figure 2B:
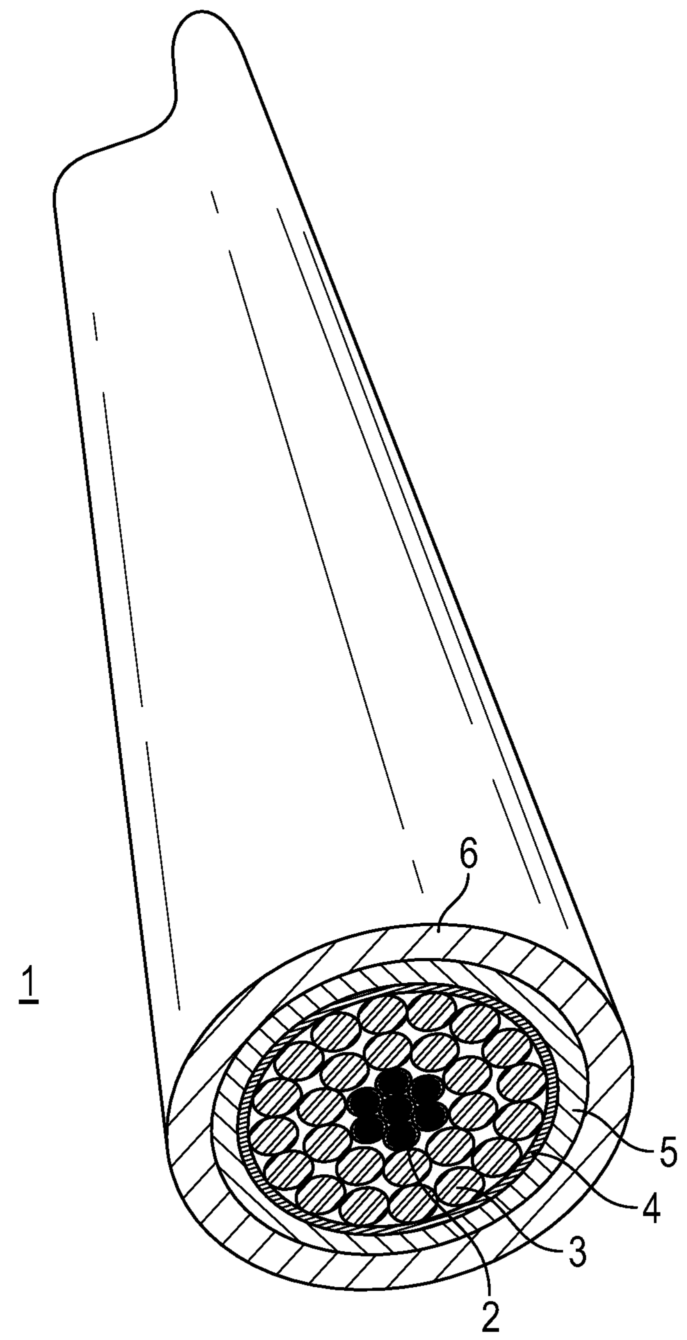
FIG. 2B represents a cross-sectional view of a tree wire.

FIG. 2 represents a view of a length of tree-wire 1 with the same numbered elements as shown in FIG. 1.

As stated below, the tree wire disclosed herein exhibits improved sag properties compared to an ACSR tree wire, as well as an ACSR bare conductor.

Another unexpected aspect relates to an increased ampacity compared to an ACSR tree wire because hysteresis losses (also called magnetic losses) in the steel core no longer have to be considered. It was discovered that a tree wire disclosed herein (compared to a comparable ACSR tree wire) has an increased ampacity that ranges from about 8% to about 12%, including all values in between, such as for example, about 9%, about 10%, and about 11%.

Accordingly, an aspect relates to a tree wire having an ampacity that may be from about 1.08 to about 1.12 times an ampacity of an ACSR tree wire, where each tree wire has the same size, stranding, and covering thickness.

In one aspect, the composite core comprises one capped strand or seven capped strands. In another aspect, the composite core has an outer diameter (in inches ("in")) that ranges from about 0.07 to about 0.50. In a specific embodiment, the composite core has an outer diameter (in) of 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, or 0.49. In a particular embodiment, the composite core has an outer diameter (in) of 0.0835, 0.1024, 0.1051, 0.1181, 0.1247, 0.1299, 0.1327, 0.1366, 0.1488, 0.1640, 0.1667, 0.1759, 0.1870, 0.1886, 0.2088, 0.2385, 0.2505, 0.2676, 0.2677, 0.2874, 0.3071, 0.3072, 0.3153, 0.3345, 0.3543, 0.3741, 0.4086, 0.4410, or 0.4920.

In one aspect, the composite core comprises substantially continuous carbon fibers. See, e.g., Honda, Kimura, Ushijima, and Sato. In yet another aspect, the carbon fibers comprise a polyacrylonitrile, an aramid fiber, a rayon, a petroleum pitch, or other suitable carbon-based material. Examples of carbon fibers include, but are not limited to, a carbon (graphite, graphene, or nanotubes) fiber, KEVLAR fibers, an aramid fiber, a high performance polyethylene fiber, or carbon nanofibers, or nanotubes. Several types of fibers are commercially available. Polyacrylonitrile ("PAN") fibers may be obtained from a PAN carbon fiber or a PAN precursor. Other carbon fibers would include, PAN-IM, PAN-HM, PAN-UHM, PITCH, or rayon byproducts, among others.

In another aspect, the first resin comprises a thermoset resin, a thermoplastic resin, or a combination thereof.

In yet another aspect, the first resin comprises a thermoset resin. Exemplary thermoset resins include, but are not limited to, an epoxy series resin, an unsaturated polyester series resin, a polyurethane resin, and a bismaleic amide resin. See, e.g., Sato, Mehdi, and Ushijima. When the cable is required to have heat resistance of more than 200° C., a bismaleic amide resin is preferably used.

In another aspect, the first resin comprises a thermoplastic resin. Exemplary thermoplastic resins include, but are not limited to, a polyolefin (e.g., a polypropylene, a propylene-ethylene copolymer, etc.), a polyester (e.g., a polybutylene terephalate (PBT)), a polycarbonate, a polyamide (e.g., NYLON), a polyether ketone (e.g., a polyetherether ketone (PEEK)), a polyetherimide, a polyarylene ketone (e.g., a polyphenylene diketone (PPDK)), a liquid crystal polymer, a polyarylene sulfide (e.g., a polyphenylene sulfide (PPS), a poly(biphenylene sulfide ketone), a poly(phenylene sulfide diketone), a poly(biphenylene sulfide), etc.), a fluoropolymer (e.g., a polytetrafluoroethylene-perfluoromethylvinylether polymer, a perfluoro-alkoxyalkane polymer, a petrafluoroethylene polymer, an ethylene-tetrafluoroethylene polymer, etc.), a polyacetal, a polyurethane, a polycarbonate, a styrenic polymer (e.g., an acrylonitrile butadiene styrene (ABS)), and the like, or a combination thereof. See, e.g., Daniel.

In a further aspect, the second resin comprises a thermoplastic resin. A suitable thermoplastic for use as the second resin includes, but is not limited to, a polyolefin (e.g., a polypropylene, a propylene-ethylene copolymer, etc.), a polyester (e.g., a polyethylene terephthalate (PET), a polybutylene terephalate (PBT)), a polycarbonate, a polyamide (e.g., NYLON), a polyether ketone (e.g., a polyetherether ketone (PEEK)), a polyetherimide, a polyarylene ketone (e.g., a polyphenylene diketone (PPDK)), a liquid crystal polymer, a polyarylene sulfide (e.g., a polyphenylene sulfide (PPS), a poly(biphenylene sulfide ketone), a poly(phenylene sulfide diketone), a poly(biphenylene sulfide), etc.), a fluoropolymer (e.g., a polytetrafluoroethylene-perfluoromethylvinylether polymer, a perfluoro-alkoxyalkane polymer, a petrafluoroethylene polymer, a ethylene-tetrafluoroethylene polymer, etc.), a polyacetal, a polyurethane, a polycarbonate, a styrenic polymer (e.g., an acrylonitrile butadiene styrene (ABS)), an acrylic polymer, a polyvinyl chloride (PVC), and the like, or a combination thereof. A particularly suitable high dielectric strength second resin may include a polyester (e.g., a polyethylene terephthalate (PET)), a polyketone (e.g., a polyetherether ketone (PEEK)), a polysulfide (e.g., polyarylene sulfide), or a combination thereof. Another particularly suitable dielectric strength second resin may include a polyethylene terephthalate.

In one aspect, the tree wire disclosed herein comprises a plurality of aluminum strands ("AL Strands") comprises 1350-H19, 1350-0, or an aluminum zirconium alloy (hereafter "AlZr"), where the AlZr contains aluminum (e.g., 1350-H19 aluminum) and from about 0.2 to about 0.33% by weight of zirconium. In another aspect, each of the AL Strands have an outer diameter (in) that ranges from about 0.07 to about 0.40. In yet another aspect, each of the AL Strands has a diameter (in) of 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, or 0.40. In a particular aspect, each of the AL Strands has a diameter (in) of 0.0772, 0.0834, 0.0943, 0.0974, 0.1013, 0.1052, 0.1059, 0.1137, 0.1151, 0.1181, 0.1184, 0.1217, 0.1236, 0.1261, 0.1287, 0.1327, 0.1329, 0.1354, 0.1362, 0.1367, 0.1410, 0.1456, 0.1463, 0.1486, 0.1489, 0.1523, 0.1564, 0.1628, 0.1672, 0.1749, 0.1758, 0.1820, 0.1878, or 0.1880.

In an aspect, the tree wire disclosed herein comprises a plurality of AlZr strands. Data shows that AlZr exhibits an increased thermal stability. Per published standards, an ACSR tree wire using 1350-H19 aluminum may operate at a temperature of about 90° C. provided that the ACSR tree wire has a cross-linked polyethylene ("XLPE") covering. Aluminum 1350-H19 anneals at about 93° C., and thus, a long-term strength loss may be realized from routine operation at about 90° C. Use of AlZr eliminates the possibility of a long-term strength loss because the annealing temperature of AlZr is about 100° C. greater than the emergency operating temperature.

As depicted in FIG. 1, the aluminum strands generally have a circular (or round) cross-sectional shape. In another aspect, the aluminum strands having a round cross-sectional shape have a stranding (e.g., the number of AL strands and the number of capped strands) selected from 6/1, 7/1, 18/1, 20/7, 22/7, 24/7, 26/7, 30/7, 36/1, 42/7, and 45/7. In yet another aspect, a stranding 6/1 and 7/1 has a single conductor layer. Additionally, a stranding of 18/1, 26/7, 18/1, 20/7, 22/7, 24/7, 26/7, and 30/7 has a double conductor layer. Further, a stranding of 36/1, 42/7, and 45/7 has a triple conductor layer. It is contemplated that different configurations may be utilized in the tree wire disclosed herein, including, but not limited to, trapwire, full/partial compress, smooth body, aero z, and the like.

One may appreciate that FIGS. 1-2 shows a void space between a portion of the covering system (e.g., a conductor shield 4) and the plurality of aluminum strands 3. In practice, there is no void space between the plurality of aluminum strands 3 and the covering system (e.g., conductor shield 4). Thus, one aspect relates to a tree wire wherein the covering system intimately contacts the outer portions of the aluminum strands. As stated elsewhere, the covering system may comprise either a conductor shield and a covering layer or a covering layer. For an embodiment where no conductor shield is present, one may appreciate that the covering layer intimately contacts the outer portions of the aluminum strands. Alternatively, for an embodiment where no conductor shield is present and the covering layer comprises an inner and outer layer, one may appreciate that the inner covering layer intimately contacts the outer portions of the aluminum strands.

In an aspect of the conductor shield, of the tree wire disclosed herein, if present, the third resin comprises polyethylene and the ionic substance comprises a carbon black and wherein the conductor shield has a thickness of from about 8 mils to about 35 mils, including all values in between, such as for example, about 9 mils, about 10 mils, about 11 mils, about 12 mils, about 13 mils, about 14 mils, about 15 mils, about 16 mils, about 17 mils, about 18 mils, about 19 mils, about 20 mils, about 21 mils, about 22 mils, about 23 mils, about 24 mils, about 25 mils, about 26 mils, about 27 mils, about 28 mils, about 29 mils, about 30 mils, about 31 mils, about 32 mils, about 33 mils, and about 34 mils.

In an aspect of the covering layer of the tree wire disclosed herein each of the fourth and fifth resins comprises an optionally cross-linked polyethylene, such as, HDPE or XLPE. The cross-linking, when present, may achieved by a suitable method, such as for example, cross-linking using a peroxide (e.g., dicumyl peroxide or di-tert-butyl peroxide), a silane (e.g., trimethoxyvinylsilane), irradiation, or by an azo-mediated cross-linking process.

In an aspect of the tree wire disclosed herein, the covering layer (c-2) comprises an inner covering layer and an outer covering layer, wherein the inner covering layer comprises the fourth resin, where the inner covering layer is disposed on the periphery of the plurality of aluminum strands (b), or if present, the periphery of conductor shield (c-1), and wherein the outer covering layer comprises the fifth resin and a colorant, where the outer covering layer is disposed on the periphery of the inner covering layer In an aspect of the inner and outer covering layers of the tree wire disclosed herein each of the fourth and fifth resins comprises an optionally cross-linked polyethylene, such as, HDPE or XLPE. The cross-linking, when present, may be achieved by a suitable method, such as for example, cross-linking using a peroxide (e.g., dicumyl peroxide or di-tert-butyl peroxide), a silane (e.g., trimethoxyvinylsilane), irradiation, or by an azo-mediated cross-linking process.

In an aspect of the covering layer of the tree wire disclosed herein, the fifth resin comprises a polyethylene and the colorant comprises a carbon black.

In an aspect of the outer covering layer of the tree wire disclosed herein, the fifth resin comprises a polyethylene and the colorant comprises a carbon black.

In another aspect of the tree wire disclosed herein, each of the inner covering layer and outer covering layer independently have a thickness (mils) of from about 70 mils to about 320 mils, including all values in between, such as for example, about 75 mils, about 80 mils, about 85 mils, about 90 mils, about 95 mils, about 100 mils, about 105 mils, about 110 mils, about 115 mils, about 120 mils, about 125 mils, about 130 mils, about 135 mils, about 140 mils, about 145 mils, about 150 mils, about 155 mils, about 160 mils, about 165 mils, about 170 mils, about 175 mils, about 180 mils, about 185 mils, about 190 mils, about 195 mils, about 200 mils, about 205 mils, about 210 mils, about 215 mils, about 220 mils, about 225 mils, about 230 mils, about 235 mils, about 240 mils, about 245 mils, about 250 mils, and about 255 mils, about 260 mils, about 265 mils, about 270 mils, about 275 mils, about 280 mils, about 285 mils, about 290 mils, about 295 mils, about 300 mils, about 305 mils, about 310 mils, and about 315 mils.

In one aspect, the tree wire has an outer diameter of from about 0.60 in to about 2.50 in and all values in between, including for example, about 0.65 in, about 0.70 in, about 0.75 in, about 0.80 in, about 0.85 in, about 0.90 in, about 0.95 in, about 1.00 in, about 1.05 in, about 1.10 in, about 1.15 in, about 1.20 in, about 1.25 in, about 1.30 in, about 1.35 in, about 1.40 in, about 1.45 in, about 1.50 in, about 1.55 in, about 1.60 in, about 1.65 in, about 1.70 in, and about 1.75 in, about 1.80 in, about 1.85 in, about 1.90 in, about 1.95 in, about 2.00 in, about 2.05 in, about 2.10 in, about 2.15 in, about 2.20 in, about 2.25 in, about 2.30 in, about 2.35 in, about 2.40 in, and about 2.45 in.

In another aspect, the tree wire has a voltage rating of about 15 kV, about 25 kV, about 35 kV, about 46 kV, about 69 kV, or about 115 kV.

In another aspect, the tree wire has a rated strength of about 2,000 lb to about 55,000 lb and all values in between, including for example, 2,300, 2,450, 3,310, 3,650, 3,890, 4,910, 5,310, 5,790, 6,160, 7,280, 7,750, 8,460, 9,670, 10,300, 11,400, 11,500, 12,200, 12,800, 14,600, 15,300, 16,500, 16,900, 18,200, 18,500, 19,100, 19,200, 20,000, 20,600, 21,200, 22,300, 23,600, 24,400, 25,700, 26,700, 27,100, 30,300, 30,400, 31,500, 34,400, 36,700, 40,600, 43,700, 44,400, and 54,100.

The tree wire disclosed herein shows marked improvements compared to either an ACSR tree wire or an ACSR bare conductor. The improvements may be rationalized by evaluating the catenary constants of an exemplary tree wire disclosed herein and comparable ACSR tree wire and ACSR bare conductor. The catenary constant, also called the H/w constant, is a ratio of the horizontal tension of a conductor (in lb) to its weight per ft (lb/ft). The resulting ratio is in units of ft, and is inversely proportional to the sag of an overhead conductor. The higher the catenary constant, the lower the sag.

Figure 9:
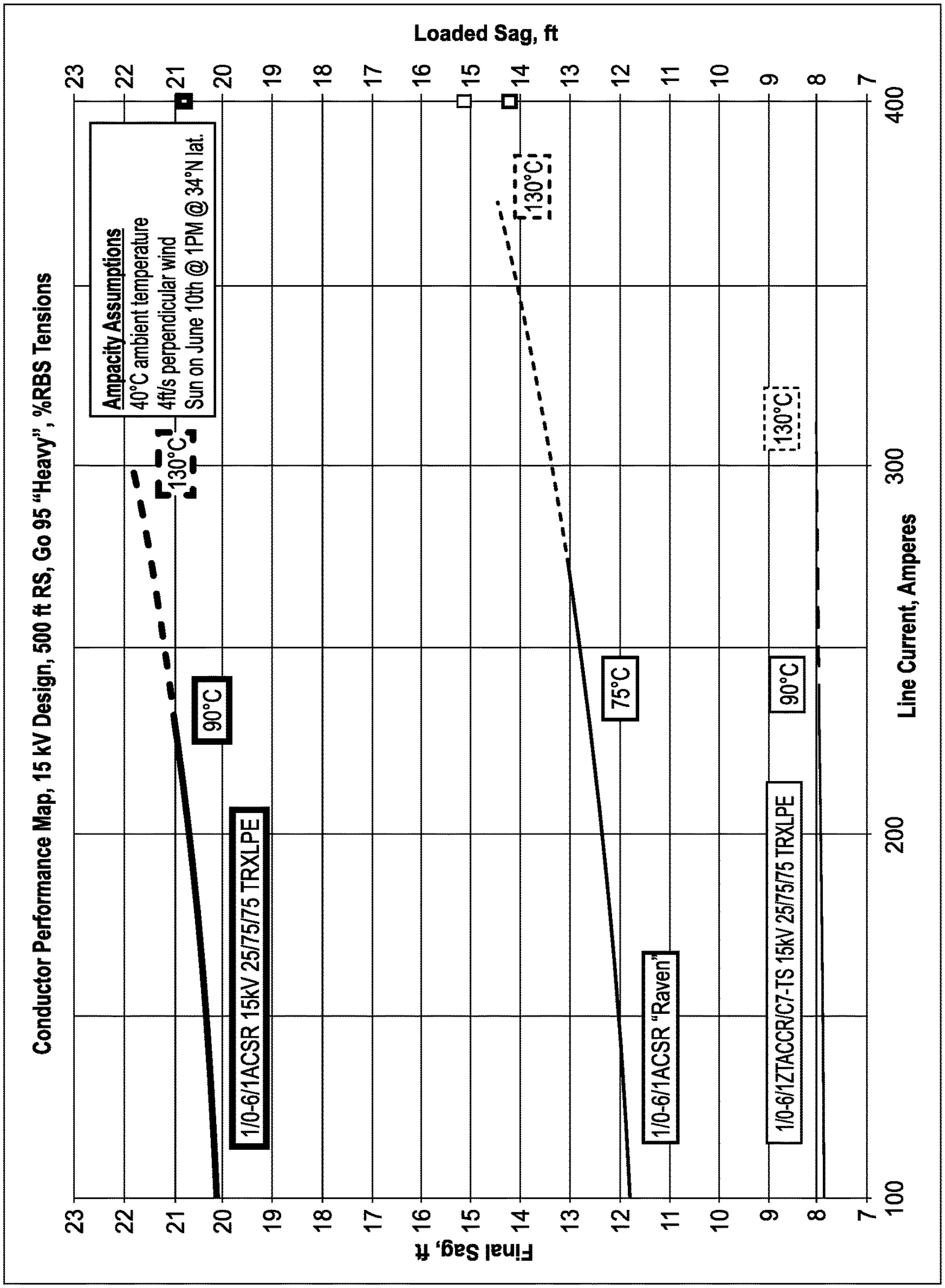
FIG. 9 represents a performance map showing sag as a function of line current for an ACSR tree wire, an ACSR bare conductor, and a tree wire disclosed herein (e.g., Ex. No. 3.3).

As stated above, FIG. 9 represents a performance map showing sag as a function of line current for an ACSR tree wire (upper line), an ACSR bare conductor (middle line), and a tree wire disclosed herein (bottom line), each of which have a voltage rating of 15 kV. One will appreciate that the tree wire disclosed herein has a sag (e.g., final or loaded) at a typical operating temperature of from 90° C. to about 130° that is lower than that of an ACSR tree wire or a bare ACSR. Again, the higher the catenary constant, the lower the sag. Thus, an exemplary tree wire disclosed herein has a higher catenary constant compared to a comparable ACSR tree wire or a comparable bare ACSR.

When one considers a utility replacing a bare ACSR conductor to an ACSR tree wire, the weight per foot is going to increase, which reduces the catenary constant, which leads to more sag. The surprising aspect of the tree wire disclosed herein is that the horizontal tension stays at a higher percentage of its initial value as operating temperature increases; this is regardless of the initial tension at which the utility chooses to install the conductor. The reduction in weight from replacing the steel core with a composite core, coupled with the material's ability to retain a higher percentage of horizontal tension across its operating range, means that the catenary constant of the tree wire disclosed herein at maximum operating temperature (e.g., about 130° C.) is higher than the catenary constants of both the same size ACSR tree wire, and the same size ACSR bare conductor. The last aspect is an unexpected property of the tree wire disclosed herein. The following table summarizes aspects of the conductors (15 kV voltage rating) analyzed in FIG. 9, including the estimated catenary constant ("H/w") for each conductor at a maximum operating temperature of about 130° C.

| | | | Covering Thickness (mils) | | | |
|---|---|---|---|---|---|---|
| Conductor | Size (AWG) | Stranding | Conductor Shield | Inner Layer[b)] | Outer Layer[b)] | H/w (ft) |
| Tree Wire | 1/0 | 6/1 | 25 | 75 | 75 | 3882 |
| ACSR Tree Wire | 1/0 | 6/1 | 25 | 75 | 75 | 1440 |
| ACSR Bare Conductor ("Raven") | 1/0 | 6/1 | — | — | — | 2165 |

[a)]Ampacity assumptions: 40° C. ambient temperature, 4 ft/s perpendicular wind.
[b)]Using track-resistant cross-linked polyethylene (TRXLPE).

Based on this data, it may be seen that the H/w for a tree wire disclosed herein (e.g., Ex. No. 3.3) has a value of 3882 ft ("H/wTw"). This should be contrasted to a comparable ACSR tree wire, which has a H/w of 1440 ft. This also should be contrasted to a comparable ACSR bare conductor (viz., Raven), which has a H/w of 2165 ft ("H/wAcsR"). The data may also be evaluated as a ratio, e.g., the ratio of H/wTw-to-H/wAcsR ("CC-ratio") may be estimated to be about 1.8 (i.e., 3882 ft/2165 ft). One may also estimate other H/w-ratios for comparable systems to be about 1.10 to about 1.90.

In one aspect, the tree wire disclosed has a catenary constant at a maximum operating temperature ("MOT") of from about 1.10 to about 1.90 times a catenary constant for a bare ACSR having the same stranding, size, and voltage rating of the tree wire.

In one aspect, the tree wire disclosed herein has a CC-ratio of from about 1.10 to about 1.90, including all values in between, such as for example, 1.15, 1.20, 1.25, 1.30, 1.35, 1.40, 1.45, 1.50, 1.55, 1.60, 1.65, 1.70, 1.75, 1.80, and 1.85.

One aspect relates to a method of manufacturing the tree wire disclosed herein, which comprises: providing the composite core; stranding the plurality of aluminum conductor strands around the composite core; and covering successively the plurality of aluminum conductor strands around the composite core with the covering system; and the outer covering layer; and rating the manufactured tree wire with a rated strength as calculated by equation (1):

$$\text{rated strength}=(n_{con}\times STR_{con}\times RF_{con})+(n_{core}\times STR_{core}\times RF_{core}) \quad (1)$$

wherein: $n_{con}$ is a number of strands in the plurality of aluminum strands; $n_{core}$ is the number of capped strands in the composite core; $STR_{con}$ is a breaking strength (e.g., nominal, minimum, or average) of the aluminum strands in the plurality of aluminum strands at an elongation equal to the minimum of $\varepsilon_{con}$ and $\varepsilon_{core}$; $STR_{core}$ is a breaking strength (e.g., nominal, minimum, or average) of the at least one capped strands in the composite core at an elongation equal to the minimum of $\varepsilon_{con}$ and $\varepsilon_{core}$; $\varepsilon_{con}$ is the amount of strain at break of the aluminum strands in the plurality of aluminum strands; $\varepsilon_{core}$ is the amount of strain at break of the at least one capped strand in the composite core; $RF_{con}$ is a rating factor of the plurality of aluminum strands; and $RF_{core}$ is a rating factor of the at least one capped strands.

As seen from FIGS. 3-9, tree wires disclosed herein may have numerous physical characteristics.

In one aspect, a tree wire disclosed herein has the following physical characteristics: a size of 1/0 AWG, a stranding of 6/1, an AL strand diameter of about 0.13 in, a single core strand, a composite core outer diameter of about 0.13 in, a conductor diameter of about 0.4 in, a conductor shield having a thickness of about 25 mils, an inner covering layer having a thickness of about 75 mils, an outer covering layer having a thickness of about 75 mils, a tree wire (or cable) outer diameter of about 0.75 in, and a rated strength of about 5,800 lbs.

In another aspect, a tree wire disclosed herein has the following physical characteristics: a size of about 336 kcmil, a stranding of 18/1, an AL strand diameter of about 0.14 in, a single core strand, a composite core outer diameter of about 0.14 in, a conductor diameter of about 0.7 in, a conductor shield having a thickness of about 25 mils, an inner covering layer having a thickness of about 75 mils, an outer covering layer having a thickness of about 75 mils, a tree wire (or cable) outer diameter of about 1.0 in, and a rated strength of 9,700 lbs.

In yet another aspect, a tree wire disclosed herein has the following physical characteristics: a size of about 398 kcmil, a stranding of 18/1, an AL strand diameter of about 0.15 in, a single core strand, a composite core outer diameter of about 0.15 in, a conductor diameter of about 0.7 in, a conductor shield having a thickness of about 25 mils, an inner covering layer having a thickness of about 75 mils, an outer covering layer having a thickness of about 75 mils, a tree wire (or cable) outer diameter of about 1.1 in, and a rated strength of 11,500 lbs.

In a further aspect, a tree wire disclosed herein has the following physical characteristics: size of about 398 kcmil, a stranding of 26/7, an AL strand diameter of about 0.12 in, seven capped strands, a composite core outer diameter of about 0.3 in, a conductor diameter of about 0.8 in, a conductor shield having a thickness of about 25 mils, an inner covering layer having a thickness of about 75 mils, an outer covering layer having a thickness of about 75 mils, a tree wire (or cable) outer diameter of about 0.75 in, and a rated strength of 21,000 lbs.

Additional aspects of a tree wire disclosed herein include physical characteristics, as described in each of Example Nos. 3.1, 3.2, 3.3, 3.4, 3.5, 3.6, 3.7, 3.8, 3.9, 3.10, 3.11, 3.12, 3.13, 3.14, 3.15, 3.16, 3.17, 3.18, 3.19, 3.20, 3.21, 3.22, 3.23, 3.24, 3.25, 3.26, 3.27, 3.28, 3.29, 3.30, 3.31, 3.32, 3.33, 3.34, 3.35, 3.36, 3.37, 3.38, 3.39, 3.40, 3.41, 3.42, 3.43, 3.44, 3.45, 3.46, 3.47, 3.48, 4.1, 4.2, 4.3, 4.4, 4.5, 4.6, 4.7, 4.8, 4.9, 4.10, 4.11, 4.12, 4.13, 4.14, 4.15, 4.16, 4.17, 4.18, 4.19, 4.20, 4.21, 4.22, 4.23, 4.24, 4.25, 4.26, 4.27, 4.28, 4.29, 4.30, 4.31, 4.32, 4.33, 4.34, 4.35, 4.36, 4.37, 4.38, 4.39, 4.40, 4.41, 4.42, 4.43, 4.44, 5.1, 5.2, 5.3, 5.4, 5.5, 5.6, 5.7, 5.8, 5.9, 5.10, 5.11, 5.12, 5.13, 5.14, 5.15, 5.16, 5.17, 5.18, 5.19, 5.20, 5.21, 5.22, 5.23, 5.24, 5.25, 5.26, 5.27, 5.28, 5.29, 5.30, 5.31, 5.32, 5.33, 5.34, 5.35, 5.36, 5.37, 5.38, 5.39, 5.40, 5.41, 6.1, 6.2, 6.3, 6.4, 6.5, 6.6, 6.7, 6.8, 6.9, 6.10, 6.11, 6.12, 6.13, 6.14, 6.15, 6.16, 6.17, 6.18, 6.19, 6.20, 6.21, 6.22, 6.23, 6.24, 6.25, 6.26, 6.27, 6.28, 6.29, 6.30, 6.31, 6.32, 7.1, 7.2, 7.3, 7.4, 7.5, 7.6, 7.7, 7.8, 7.9, 7.10, 7.11, 7.12, 7.13, 7.14, 7.15, 7.16, 7.17, 7.18, 7.19, 7.20, 7.21, 7.22, 7.23, 7.24, 7.25, 7.26, 7.27, 7.28, 7.29, 8.1, 8.2, 8.3, 8.4, 8.5, 8.6, 8.7, 8.8, 8.9, 8.10, 8.11, 8.12, 8.13, 8.14, 8.15, 8.16, 8.17, 8.18, 8.19, 8.20, 8.21, 8.22, 8.23, and 8.24.

Disclosed Aspects

Certain features of the low sag tree wire disclosed herein relates to the following aspects.

Aspect 1. A tree wire, comprising: (a) a composite core comprised of at least one capped strand including a first resin supporting a matrix of carbon fibers and a capping layer including a second resin disposed on the surface of the first resin; (b) a plurality of aluminum strands disposed on the periphery of the composite core; and (c) a covering system comprising (c-1) optionally, a conductor shield including a third resin and an ionic substance dispersed therein, where the conductor shield is disposed on the periphery of the plurality of aluminum strands; and (c-2) a covering layer comprising a fourth resin, a fifth resin, or a combination thereof, where the covering layer is disposed on the periphery of the plurality of aluminum strands (b), or if present, the periphery of conductor shield (c-1); wherein the tree wire has a voltage rating of from about 15 kV to about 115 kV and a rated strength of from about 2,300 lbs. to about 55,000 lbs.

Aspect 2. The tree wire of Aspect 1, wherein the composite core comprises one capped strand or seven capped strands.

Aspect 3. The tree wire of any one of Aspects 1-2, wherein the composite core has an outer diameter (in) of from about 0.07 to about 0.5.

Aspect 4. The tree wire of any one of Aspects 1-3, wherein the first resin comprises a thermoset resin, a thermoplastic resin, or a combination thereof.

Aspect 5. The tree wire of Aspect 4, wherein the thermoset resin comprises an epoxy series resin, an unsaturated polyester series resin, a polyurethane resin, and a bismaleic amide resin.

Aspect 6. The tree wire of Aspect 4, wherein the thermoplastic resin comprises a polyolefin, a polyester, a polycarbonate, a polyamide, a polyether ketone, a polyetherimide, a polyarylene ketone, a liquid crystal polymer, a polyarylene sulfide, a fluoropolymer, a polyacetal, a polyurethane, a polycarbonate, a styrenic polymer, or a combination thereof.

Aspect 7. The tree wire of any one of Aspects 1-6, wherein the carbon fibers comprise a polyacrylonitrile, an aramid fiber, a rayon, a petroleum pitch, or a combination thereof.

Aspect 8. The tree wire of any one of Aspects 1-7, wherein the second resin comprises a polyolefin, a polyester, a polycarbonate, a polyamide, a polyether ketone, a polyetherimide, a polyarylene ketone, a liquid crystal polymer, a polyarylene sulfide, a fluoropolymer, a polyacetal, a polyurethane, a polycarbonate, a styrenic polymer, an acrylic polymer, a polyvinyl chloride, or a combination thereof.

Aspect 9. The tree wire of any one of Aspects 1-8, wherein the plurality of aluminum strands comprises 1350-H19, 1350-0, or an aluminum zirconium alloy (0.2-0.33% zirconium), and wherein each aluminum strand has a diameter (in) of about 0.07 to about 0.40.

Aspect 10. The tree wire of any one of Aspects 1-9, wherein the number of aluminum strands to composite core (or stranding) is selected from 6/1, 7/1, 18/1, 20/7, 22/7, 24/7, 26/7, 30/7, 36/1, 42/7, and 45/7.

Aspect 11. The tree wire of any one of Aspects 1-10, wherein the covering system comprises the conductor shield, and wherein the third resin comprises polyethylene and the ionic substance comprises a carbon black and wherein the conductor shield has a thickness of from about 8 mils to about 35 mils.

Aspect 12. The tree wire of any one of Aspects 1-11, wherein each of the fourth and fifth resins comprises an optionally cross-linked polyethylene, such as, HDPE or XLPE.

Aspect 13. The tree wire of any one of Aspects 1-12, wherein the fifth resin comprises a polyethylene and the colorant comprised of carbon black.

Aspect 14. The tree wire of any one of Aspects 1-13, wherein the covering layer (c-2) comprises an inner covering layer and an outer covering layer, wherein the inner covering layer comprises the fourth resin, where the inner covering layer is disposed on the periphery of the periphery of the plurality of aluminum strands (b), or if present, the periphery of conductor shield (c-1), wherein the outer covering layer comprises the fifth resin and a colorant, where the outer covering layer is disposed on the periphery of the inner covering layer, and wherein each of the inner covering layer and outer covering layer independently have a thickness (mils) of from about 70 mils to about 320 mils.

Aspect 15. The tree wire of any one of Aspects 1-14 having an outer diameter (in) of about 0.60 to about 2.50 in.

Aspect 16. The tree wire of any one of Aspects 1-15 having a voltage rating (kV) of about 15, about 25, about 35, about 46, about 69, or about 115.

Aspect 17. The tree wire of any one of Aspects 1-16 having a rated strength (lbs.) of from about 2,000 to about 55,000.

Aspect 18. The tree wire of any one of Aspects 1-17 having an ampacity of from about 1.08 to about 1.12 times an ampacity of an ACSR tree wire, where each tree wire has the same size, stranding, and covering thickness as the ACSR tree wire.

Aspect 19. The tree wire of any one of Aspects 1-18 having a catenary constant at a maximum operating temperature of from about 1.10 to about 1.90 times a catenary constant for a bare ACSR having the same stranding and size of the tree wire.

Aspect 20. A method of manufacturing the tree wire of any one of Aspects 1-19, comprising: providing the composite core; stranding the plurality of aluminum conductor strands around the composite core; covering successively the plurality of aluminum conductor strands around the composite core with the covering system; and rating the manufactured tree wire with a rated strength as calculated by equation (1):

$$\text{rated strength}=(n_{con}\times STR_{con}\times RF_{con})+(n_{core}\times STR_{core}\times RF_{core}) \quad (1)$$

wherein:

$n_{con}$ is a number of strands in the plurality of aluminum strands;

$n_{core}$ is the number of capped strands in the composite core;

$STR_{con}$ is a breaking strength (e.g., nominal, minimum, or average) of the aluminum strands in the plurality of aluminum strands at an elongation equal to the minimum of $\varepsilon_{con}$ and $\varepsilon_{core}$;

$STR_{core}$ is a breaking strength (e.g., nominal, minimum, or average) of the at least one capped strands in the composite core at an elongation equal to the minimum of $\varepsilon_{con}$ and $\varepsilon_{core}$;

$\varepsilon_{con}$ is the amount of strain at break of the aluminum strands in the plurality of aluminum strands;

$\varepsilon_{core}$ is the amount of strain at break of the at least one capped strand in the composite core;

$RF_{con}$ is a rating factor of the plurality of aluminum strands; and $RF_{core}$ is a rating factor of the at least one capped strands.

CITED INFORMATION

Daniel et al., Electrical Transmission Cables with Composite Cores, U.S. Pat. No. 9,012,781 B2, issued on Apr. 21, 2015 ("Allen").

Honda et al., Composite Rope and Manufacture Thereof U.S. Pat. No. 4,677,818 A, issued on Jul. 7, 1987 ("Honda").

Kimura et al., Fiber Composite Twisted Cable, U.S. Pat. No. 8,250,845 B2, issued on Aug. 28, 2012 ("Kimura").

Mehdi et al., "X-Functional Phthalonitrile Monomers and Polymers," Chapter 3, *In Plastics Design Library, Phthalonitrile Resins and Composites*, Eds. Mehdi et al., William Andrew Publishing, 2018, Pages 107-174 ("Mehdi").

Powers, W. F., Rating an Enhanced Strength Conductor, U.S. Pat. No. 9,847,152 B2, issued on Dec. 19, 2017 ("Powers").

Sato et al., *Development of a Low Sag Aluminum Conductor Carbon Fiber Reinforced for Transmission Lines*, Cigré Report 22-203, 2002 ("Sato").

Ushijima, K., Cable made of High Strength Fiber Composite Material, U.S. Pat. No. 7,650,742, issued on Jan. 26, 2010 ("Ushijima").

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the embodiments described herein, the disclosure may be practiced other than as specifically described herein.

It will be understood that the expression "comprising" may be replaced with the expression "consisting of" for the embodiments disclosed herein.

The subject matter of U.S. Provisional Patent Application No. 62/929,516, filed on Nov. 1, 2019, is incorporated herein by reference All documents disclosed herein are hereby incorporated by reference in their entirety. The definitions and/or meanings of subject matter described herein controls in the event that incorporated subject matter conflicts with subject matter described herein.

The invention claimed is:

1. A tree wire, comprising:

(a) a composite core comprised of at least one capped strand including a first resin consisting of a thermoset resin, said first resin supporting a matrix of carbon fibers and a capping layer including a second resin disposed on the surface of the first resin;

(b) a plurality of aluminum strands comprising an aluminum zirconium alloy disposed on the periphery of the composite core; and (c) a three-layered covering system consisting of:

(c-1) a conductor shield comprising a third resin and an ionic substance dispersed therein, where the conductor shield is disposed on the periphery of the plurality of aluminum strands, wherein the conductor shield has a thickness of from about 8 mils to about 35 mils; and (c-2) a covering layer comprising an inner layer comprising a polyethylene or a cross-linked polyethylene and an outer layer consisting of a polyethylene or a cross-linked polyethylene and optionally carbon black, wherein each of the inner covering layer and outer covering layer independently has a thickness of from about 70 mils to about 320 mils;

wherein the inner layer is disposed on the periphery of the conductor shield (c-1) and wherein the outer layer is disposed on the periphery of the inner layer.

2. The tree wire of claim 1, wherein the composite core comprises one capped strand or seven capped strands.

3. The tree wire of claim 1, wherein the composite core has an outer diameter of from about 0.07 in. to about 0.5 in.

4. The tree wire of claim 1, wherein the thermoset resin is selected from an epoxy series resin, an unsaturated polyester series resin, a polyurethane resin, and a bismaleic amide resin.

5. The tree wire of claim 1, wherein the carbon fibers comprise a polyacrylonitrile, an aramid fiber, a rayon, a petroleum pitch, or a combination thereof.

6. The tree wire of claim 1, wherein the second resin comprises a polyolefin, a polyester, a polycarbonate, a polyamide, a polyether ketone, a polyetherimide, a polyarylene ketone, a liquid crystal polymer, a polyarylene sulfide, a fluoropolymer, a polyacetal, a polyurethane, a polycarbonate, a styrenic polymer, an acrylic polymer, a polyvinyl chloride, or a combination thereof.

7. The tree wire of claim 1, wherein the aluminum zirconium alloy comprises from 0.2% to 0.33% zirconium.

8. The tree wire of claim 1, wherein the number of aluminum strands to composite core is selected from 6/1, 7/1, 18/1, 20/7, 22/7, 24/7, 26/7, 30/7, 36/1, 42/7, and 45/7.

9. The tree wire of claim 1, wherein the third resin comprises polyethylene and the ionic substance comprises a carbon black and wherein the conductor shield has a thickness of from about 15 mils to about 25 mils.

10. The tree wire of claim 1, wherein the outer layer consists of the polyethylene and optionally the carbon black.

11. The tree wire of claim 1, wherein the outer layer consists of the cross-linked polyethylene and optionally the carbon black; and wherein each of the inner covering layer and outer covering layer independently has a thickness of from about 75 mils to about 320 mils.

12. The tree wire of claim 1 having an outer diameter of about 0.60 in. to about 2.50 in.

13. The tree wire of claim 1 having a voltage rating of about 15 kV, about 25 kV, about 35 kV, about 46 kV, about 69 kV, or about 115 kV.

14. The tree wire of claim 1 having a rated strength of from about 2,000 lbs. to about 55,000 lbs.

15. The tree wire of claim 1 having an ampacity of from about 1.08 to about 1.12 times an ampacity of an ACSR tree wire, wherein the tree wire has the same size, stranding, and covering thickness as the ACSR tree wire.

16. The tree wire of claim 1 having a catenary constant at a maximum operating temperature of from about 1.10 to about 1.90 times a catenary constant for a bare ACSR having the same stranding and size of the tree wire.

17. A method of manufacturing the tree wire of claim 1, comprising:

providing the composite core;

stranding the plurality of aluminum conductor strands around the composite core;

covering successively the plurality of aluminum conductor strands around the composite core with the covering system; and rating the manufactured tree wire with a rated strength as calculated by equation (1):

$$\text{rated strength}=(n_{con}\times STR_{con}\times RY_{con})+(n_{core}\times STR_{core}\times RF_{core}) \quad (1)$$

wherein:

$n_{con}$ is a number of strands in the plurality of aluminum strands;

$n_{core}$ is the number of capped strands in the composite core;

$STR_{con}$ is a breaking strength (nominal, minimum, or average) of the aluminum strands in the plurality of aluminum strands at an elongation equal to the minimum of $\varepsilon_{con}$ and $\varepsilon_{core}$;

$STR_{core}$ is a breaking strength (nominal, minimum, or average) of the at least one capped strands in the composite core at an elongation equal to the minimum of $\varepsilon_{con}$ and $\varepsilon_{core}$;

$\varepsilon_{con}$ is the amount of strain at break of the aluminum strands in the plurality of aluminum strands;

$\varepsilon_{core}$ is the amount of strain at break of the at least one capped strand in the composite core;

$RF_{con}$ is a rating factor of the plurality of aluminum strands; and $RF_{core}$ is a rating factor of the at least one capped strands.

18. The tree wire of claim 1, wherein the thermoset resin is selected from a bismaleic amide resin.

19. The tree wire of claim 1, wherein the inner layer comprises the polyethylene and wherein the outer layer consists of the cross-linked polyethylene and the carbon black.

20. The tree wire of claim 1, wherein the inner layer comprises the cross-linked polyethylene and wherein the outer layer consists of the cross-linked polyethylene and the carbon black.

* * * * *